United States Patent
Tulsky et al.

(10) Patent No.: US 9,061,903 B2
(45) Date of Patent: Jun. 23, 2015

(54) SULFONATE MODIFIED NANOCRYSTALS

(75) Inventors: Eric Tulsky, Berkeley, CA (US); Eric Welch, Eugene, OR (US); Bruce Branchaud, Eugene, OR (US); John Mauro, Eugene, OR (US); Imad Naasani, Manchester (GB)

(73) Assignee: Life Technologies Corporation, Carlsbad, CA (US)

( * ) Notice: Subject to any disclaimer, the term of this patent is extended or adjusted under 35 U.S.C. 154(b) by 890 days.

(21) Appl. No.: 13/119,557

(22) PCT Filed: Oct. 2, 2009

(86) PCT No.: PCT/US2009/059456
§ 371 (c)(1),
(2), (4) Date: May 27, 2011

(87) PCT Pub. No.: WO2010/040111
PCT Pub. Date: Apr. 8, 2010

(65) Prior Publication Data
US 2011/0220844 A1 Sep. 15, 2011

Related U.S. Application Data

(60) Provisional application No. 61/102,709, filed on Oct. 3, 2008.

(51) Int. Cl.
*C09K 11/02* (2006.01)
*B82Y 30/00* (2011.01)
(Continued)

(52) U.S. Cl.
CPC ........... *B82Y 30/00* (2013.01); *B01J 13/22* (2013.01); *B82Y 40/00* (2013.01); *C09B 68/42* (2013.01); *C09B 68/4257* (2013.01);
(Continued)

(58) Field of Classification Search
CPC .... C09K 11/56; C09K 11/562; C09K 11/565; C09K 11/567; C09K 11/88; C09K 11/881; C09K 11/883; C09K 11/885; C09K 11/886; C09K 11/7492; C09K 11/70
USPC .................................................. 252/301.4 R
See application file for complete search history.

(56) References Cited

U.S. PATENT DOCUMENTS 6,251,303 B1  6/2001 Bawendi et al.
6,423,551 B1  7/2002 Weiss et al.
(Continued)

FOREIGN PATENT DOCUMENTS

WO   WO-2010/040111       4/2010
WO   WO-2010/096084 A1    8/2010

OTHER PUBLICATIONS

Jun. Photoactivated luminescent CdSe quantum dots as sensitive cyanide probes in aqueous solutions. Chem. Commun., 2005, 883-885 | 883.*
(Continued)

*Primary Examiner* — Matthew E Hoban
(74) *Attorney, Agent, or Firm* — Life Technologies Corporation

(57) ABSTRACT

A nanoparticle having one or more phosphonates or phosphinate ligands on their surface can be converted into nanoparticles with sulfonate ligands on their surface, by contacting the phosphonate-containing nanoparticles with a silylsulfonate reagent. Such nanoparticles are activated toward reactions with nucleophilic groups; thus the method provides activated nanoparticles, and methods of making and using them to produce modified nanoparticles.

26 Claims, 6 Drawing Sheets

(51) Int. Cl.
 B01J 13/22 (2006.01)
 B82Y 40/00 (2011.01)
 C09B 67/00 (2006.01)
(52) U.S. Cl.
 CPC ............. *C09B 68/44* (2013.01); *C09B 68/441* (2013.01); *C09B 68/443* (2013.01); *C09K 11/025* (2013.01)

(56) References Cited

U.S. PATENT DOCUMENTS

| | | | |
|---|---|---|---|
| 6,426,513 | B1 | 7/2002 | Bawendi et al. |
| 6,649,138 | B2 | 11/2003 | Adams et al. |
| 6,955,855 | B2 | 10/2005 | Naasani |
| 7,172,791 | B2 | 2/2007 | Treadway et al. |
| 7,198,847 | B2 | 4/2007 | Naasani |
| 7,205,048 | B2 | 4/2007 | Naasani |
| 2001/0040232 | A1 | 11/2001 | Bawendi et al. |
| 2005/0266246 | A1 | 12/2005 | Reiss et al. |
| 2006/0088713 | A1 | 4/2006 | Dykstra et al. |
| 2008/0044340 | A1* | 2/2008 | Wu et al. ................ 423/509 |

OTHER PUBLICATIONS

Ballou, B., et al. "Noninvasive Imaging of Quantum Dots in Mice." *Bioconjugate Chem*, vol. 15, 2004, pp. 79-86.
Dabbousi, B., et al. "(CDSE)ZnS Core-Shell Quantum Dots: Synthesis and Characterization of a Size Series of Highly Luminescent Nanocrystallites." *Journal of Physical Chemistry*, vol. 101, 1997, pp. 9463-9475.
Hines, M., et al. "Synthesis and Characterization of Strongly Luminescing ZnS-Capped CdSe Nanocrystals." *J. Phys. Chem.* vol. 100, No. 2, 1996, pp. 468-471.
Kuno, M., et al. "The band edge luminescence of surface modified CdSe nanocrystallites: Probing the luminescing state." *Journal of Chemical Physics* vol. 106, No. 23, 1997, pp. 9896-9882.
Liu, W., et al. "Compact Cysteine-Coated CdSe(ZnCdS) Quantum Dots for in Vivo", *J. Amer. Chem. Soc.*, vol. 129, 2007, pp. 14530-14531.
Mattoussi, H., et al. "Self-Assembly of CdSe-ZnS Quantum Dot Bioconjugates Using an Engineered Recombinant Protein." *J Am Chem Soc*, vol. 122, No. 49, 2000, pp. 12142-12150.
International Preliminary Report on Patentability Mailed Apr. 14, 2010 for PCT Application No. PCT/US2009/059456.
International Search Report and Written Opinion Mailed Apr. 30, 2010 for PCT Application No. PCT/US2009/059456.

Peng, X., et al. "Epitaxial growth of highly luminescent Cdse/cdS core/ Shell Nanocrystals with photostability and electronic accessibilty", *J. Am. Chem. Soc.*, vol. 119, 1997, pp. 7019-7029.
Smith, A., et al. "Minimizing the Hydrodynamic Size of Quantum Dots with Multifunctional Multidentate Polymer Ligands", *J. Am. Chem. Soc.*, 130 (34), 2008, pp. 11278-11279.
Uyeda, H. et al. "Synthesis of Compact Multidentate Ligands to Prepare Stable Hydrophilic Quantum Dot Fluorophores", *J. Am. Chem. Soc.*, 127, 2005, pp. 3870-3878.
Chan, et al., "Quantum Dot Bioconjugates for Ultrasensitive Nonisotopic Detection", *Science*, vol. 281, No. 5385, 1998, pp. 2016-2018.
Susumu, K. et al., "Enhancing the Stability and Biological Functionalities of Quantum Dots via Compact Multifunctional Ligands", *Journal of the American Chemical Society*, vol. 129, No. 45, Jul. 5, 2007, 13987-13996.
Ballou, B et al., "Noninvasive Imaging of Quantum Dots in Mice.", *Bioconjugate Chem*, vol. 15, 2004, 79-86.
Dabbousi, B. O. et al., "(Cdse)Zns Core-Shell Quantum Dots: Synthesis and Characterizations of a Size Series of Highly Luminescent Nanocrystallites", *J. Phys. Chem. B.* vol. 101, No. 46, Jun. 26, 1997, 9463-9475.
Hines, Margaret A. et al., "Synthesis and Characterization of Strongly Luminescing ZnS-Capped CdSe Nanocrystals", *J. Phys. Chem.*, vol. 100, No. 2, 1996, 468-471.
Kuno, M et al., "The band edge luminescence of surface modified CdSe nanocrystallites: Probing the luminescing state", *Journal of Chemical Physics*, vol. 106, No. 23, 1997, 9869-9882.
Li, Z. et al., "Multiple thiol-anchor capped DNA-gold nanoparticle conjugates", *Nucl. Acids Res.*, 30(7), 2002, 1558-1562.
Liu, W. et al., "Compact Cysteine-Coated CdSe(ZnCdS) Quantum Dots for in Vivo", *J. Amer. Chem. Soc.*, 129, 3007, 14530-14531.
Mattoussi, H. et al., "Self-Assembly of CdSe-ZnS Quantum Dot Bioconjugates Using an Engineered Recombinant Protein", *J Am Chem Soc*, vol. 122, No. 49, Nov. 22, 2000, 12142-12150.
PCT/US2009/059456, "International Preliminary Report on Patentability Mailed Apr. 14, 2011", 7.
PCT/US2009/059456, "International Search Report and Written Opinion Mailed Apr. 30, 2010", 13.
Peng, et al., "Epitaxial growth of highly luminescent Cdse/cdS core/ Shell Nanocrystals with photostability and electronic accessibilty", *J. Am. Chem. Soc.*, vol. 119, 1997, 7019-7029.
Smith, A. et al., "Minimizing the Hydrodynamic Size of Quantum Dots with Multifunctional Multidentate Polymer Ligands", *J. Am. Chem. Soc.*, 130 (34), 2008, 11278-11279.
Uyeda, H. et al., "Synthesis of Compact Multidentate Ligands to Prepare Stable Hydrophilic Quantum Dot Fluorophores", *J. Am. Chem. Soc.*, 127, Feb. 26, 2005, 3870-3878.

* cited by examiner

SULFONATE MODIFIED NANOCRYSTALS

CROSS REFERENCE TO RELATED APPLICATIONS

This application is a national stage filing of International Application No. PCT/2009/059456, filed Oct. 2, 2009, which claims priority to U.S. Provisional Application No. 61/102,709, filed Oct. 3, 2008; which disclosures are incorporated by reference in their entirety.

TECHNICAL FIELD

This disclosure relates to nanoparticles and methods of manipulating nanoparticle surfaces. More particularly, the disclosure provides activated nanoparticle surfaces that can be further modified to introduce ligands of interest and methods of making and using such nanoparticles.

BACKGROUND

Methods for making core/shell nanocrystals that are fluorescent and have hydrophobic surfaces are well known. The hydrophobic surfaces of these nanocrystals typically result from a coating of hydrophobic passivating ligands such as trioctylphosphine (TOP), trioctylphosphine oxide (TOPO), oleic acid, octylphosphonic acid (OPA) or tetradecylphosphonic acid (TDPA) on the surface of the particle. These passivating ligands serve many roles, including, but not limited to: protecting the surface of the nanocrystal by keeping reactive molecules (and even the solvent) away from the nanocrystal surface, protecting the nanocrystal from reactions that could occur when it is in a photoactivated state, preventing the coalescence of multiple nanoparticles, preventing "dangling bonds" and other similar surface defects that could serve as trap sites for an excited electron or hole and thereby promote non-radiative recombination (i.e., reduce the quantum yield), etc. These ligands also provide a layer of alkyl groups that form the solvent-exposed surface surrounding the nanocrystal, and thus render the nanocrystal effectively hydrophobic, regardless of the inherent properties of the nanocrystal surface itself. These intimately associated ligands and the nanocrystal they are associated with form a nanoparticle.

For many applications, it may be desirable to use the layer of ligands on the surface of the nanocrystal to manipulate the properties (e.g., impart hydrophilicity, etc.) of the nanoparticle they collectively form, or to attach other molecules to the nanoparticle. There are conventional methods for doing that are known in the art. For example, one way this has been done in the past involves adding another layer of material over the layer of passivating ligands present on the conventional nanocrystal surface. Adams, et al., U.S. Pat. No. 6,649,138. The second layer is often an amphiphilic polymer (AMP) that is bound to the layer of passivating ligands only by a hydrophobic-hydrophobic interaction between the alkyl groups of the passivating ligands and similar alkyl groups on the AMP polymer. See Adams, et al. However, this effectively makes the resulting nanoparticle larger, increasing the overall size of a nanocrystal by up to 50% or more. For example, a small nanocrystal with a coating of cysteine can be about 6 nm in diameter, yet the same nanocrystal coated with TOPO plus the AMP polymers from Adams, et al. may be up to 15 nm in diameter. See Liu, et al., *J. Amer. Chem. Soc.*, vol. 129, 14530-31 (2007).

The bilayer structure of these AMP-containing nanoparticles can also make the nanoparticle susceptible to degradation that can occur if anything interferes with keeping the layer of passivating ligands on the surface of the nanocrystal, or with the interaction between these passivating ligands and the outer layer of AMP added over them.

For some applications, there are certain advantages to making a nanoparticle as small as possible, especially for certain biological applications. Smaller particles can diffuse more rapidly, have less effect on a molecule they are attached to, and may have less tendency to accumulate in specific tissues in vivo, where larger particles seem to get trapped by 'filtration' effects. See, e.g., Ballou, et al., *Bioconjugate Chem.*, vol. 15, 79-86 (2004). Thus better methods for making nanocrystals into water-soluble nanoparticles are needed, preferably methods that keep these nanoparticles as small as possible while making them highly stable and maintaining their essential fluorescence characteristics. This disclosure provides methods for achieving such objectives, and thus provides compositions and methods that produce improved nanoparticles, especially small, stable, water-soluble ones.

SUMMARY

The present disclosure relates to methods for highly efficient removal of phosphonate groups from the surface of a nanoparticle or nanocrystal by treatment with silyl reagents, particularly silyl derivatives of weak bases or other poorly coordinating groups. The result of this removal of phosphonate ligands is replacement of the phosphonates with the weakly coordinating groups. One example is the use of silyl sulfonates, such as trimethylsilyl triflate, to form a sulfonate-coated nanoparticle. Triflate is a conventional/common name for a trifluoromethanesulfonyloxy group, $CF_3SO_2O-$. Without being bound by any particular theory, FIG. 1 illustrates how this replacement may occur. Note that in this illustration, the phosphonate binds to the nanocrystal (depicted as a sphere, but of course the nanocrystal can have other shapes such as a rod or an irregular shape) through two oxygen atoms of the phosphonate, but depending on the surface environment, the phosphonate may bind to the nanocrystal surface through only one or through all three of its oxygen atoms. Therefore, the phosphonate ligand may effectively occupy one or three binding sites on the nanocrystal surface, and in some cases may be replaced by one or three triflates rather than two.

The same type of replacement process can also occur on nanoparticles having phosphinic acid ligands of the formula $R_2P(=O)-OH$ or on nanoparticles having carboxylic acid ligands of the formula $RC(=O)-OH$, which could be incorporated on the surface of a nanocrystal by known methods; R can be a $C_1$-$C_{24}$ hydrocarbon group in these phosphinates, and the two R groups can be the same or different. Thus, it is understood that when phosphonate-containing nanocrystals are described herein, phosphinate-containing nanocrystals can be used instead, with similar results.

This process provides a mild and selective method for removing phosphonate, phosphinate, and carboxylate ligands from the surface of a nanocrystal. As a result, it provides a way for a user to remove these groups and replace them, without removing other ligands that are not displaced or affected by the silylsulfonate.

Because the process provides a mild and selective way to remove phosphonate/phosphinate groups, nanocrystals made with a limited number of such groups on their surfaces can be selectively modified by replacing those groups with triflate or other sulfonates, without removing other ligands on the nanocrystal surface. Thus, the methods are suitable for producing nanocrystals with mixed ligands on their surfaces.

These reactions can provide a novel population of nanoparticles that are comprised of a plurality of nanoparticles, wherein each nanoparticle includes a nanocrystal core including a first semiconductor material, a shell including a second semiconductor material, and an outer layer comprised of sulfonate ligands.

A nanocrystal comprising one or more sulfonate ligands on its surface may be useful as an intermediate for the preparation of other, functionalized nanoparticles. In particular, they can be useful for the preparation of water dispersible nanoparticles, wherein some or all of the sulfonate ligands are replaced with other ligands that confer water dispersibility.

In another aspect, provided herein is a novel method to modify the surface and/or the surface properties of a nanoparticle having at least one phosphinate or phosphonate ligand on a nanocrystal surface. A desired surface property can be provided by using this method to introduce ligands that provide that surface property. In some embodiments, the desired surface property is water solubility. In some embodiments, the desired property is solubility in a polar protic solvent. In some embodiments, the desired property is pH responsiveness or a suitable surface pKa, or having at least one ionizable group that will be either protonated or deprotonated (i.e., charged) at a specified pH. Thus, the method can be used to modulate the pI of the nanoparticles by introducing ionizable groups onto the nanocrystal surface. In some embodiments, the desired property is the presence of a carboxylate or a primary amine, for example, available for binding to other molecules that are to be attached to the nanoparticle. For example, such functional groups can be used for cross-linking or conjugation of other moieties to the nanoparticle.

Thus, provided herein are novel nanocrystals that comprise a sulfonate ligand such as triflate on their surface, and methods to make them. It also provides methods to use such nanocrystals in further transformations. These further transformations can be used to introduce onto the surface of a nanocrystal a selected target (cargo) molecule of interest, such as an antibody or other specific affinity molecule. They can also be used to introduce a number of, or a layer of, functionalized molecules on the surface of a nanocrystal, where the functionalized molecules can provide new surface properties to the nanoparticle. For example, this method can be used to introduce enough hydrophilic ligands onto the surface of a nanocrystal to render the nanocrystal water-soluble (or water-dispersable); or to introduce charged groups onto the surface of the nanocrystal to manipulate its interactions with charge-sensitive structures like cell membranes; etc.

In another aspect, provided herein is a nanoparticle or nanocrystal made by methods described herein, that includes a water-solubilizing organic group comprising 1 to 1000 atoms, the atoms selected from H, C, N, O, S, P, Si, and halo.

In another aspect, provided herein is a method for making a water-dispersable nanoparticle by contacting a non-water soluble nanocrystal having a sulfonate ligand bonded to its surface with a functionalized organic molecule that comprises at least one available nucleophilic reactant group, under conditions that attach at least one functionalized organic molecule to the nanocrystal surface, wherein the at least one functionalized organic molecule makes the nanoparticle water-dispersable. In some embodiments, the nanocrystal having a sulfonate ligand on its surface is made from a phosphonate-containing nanocrystal by contacting the phosphonate-containing nanocrystal with a silylsulfonate as described herein.

This two-step process of replacing a phosphonate/phosphinate ligand with a functionalized organic molecule that comprises at least one available nucleophilic reactant group via a nanocrystal having a sulfonate ligand bonded to its surface has advantages over approaches to directly displacing the phosphonate/phosphinate ligand with the functionalized organic molecule. Advantages include the mild reaction conditions and low temperatures required to replace the sulfonate ligand, and the ability to use nucleophilic ligands that bind more weakly than a phosphonate group and thus could not effectively displace such ligands directly. In addition, the methods described herein allow the exchange of a larger percentage of the phosphonate ligands than would be possible by direct displacement, leading to nanoparticles having a larger number of functionalized organic molecules which confer a desired property on their surface. Such nanoparticles typically have greater colloidal stability, better conjugatability and stability of the conjugated species, and may have improved photophysical properties.

Further aspects and advantages of the embodiments disclosed herein will be apparent from the detailed description below.

DETAILED DESCRIPTION

Figure 1:
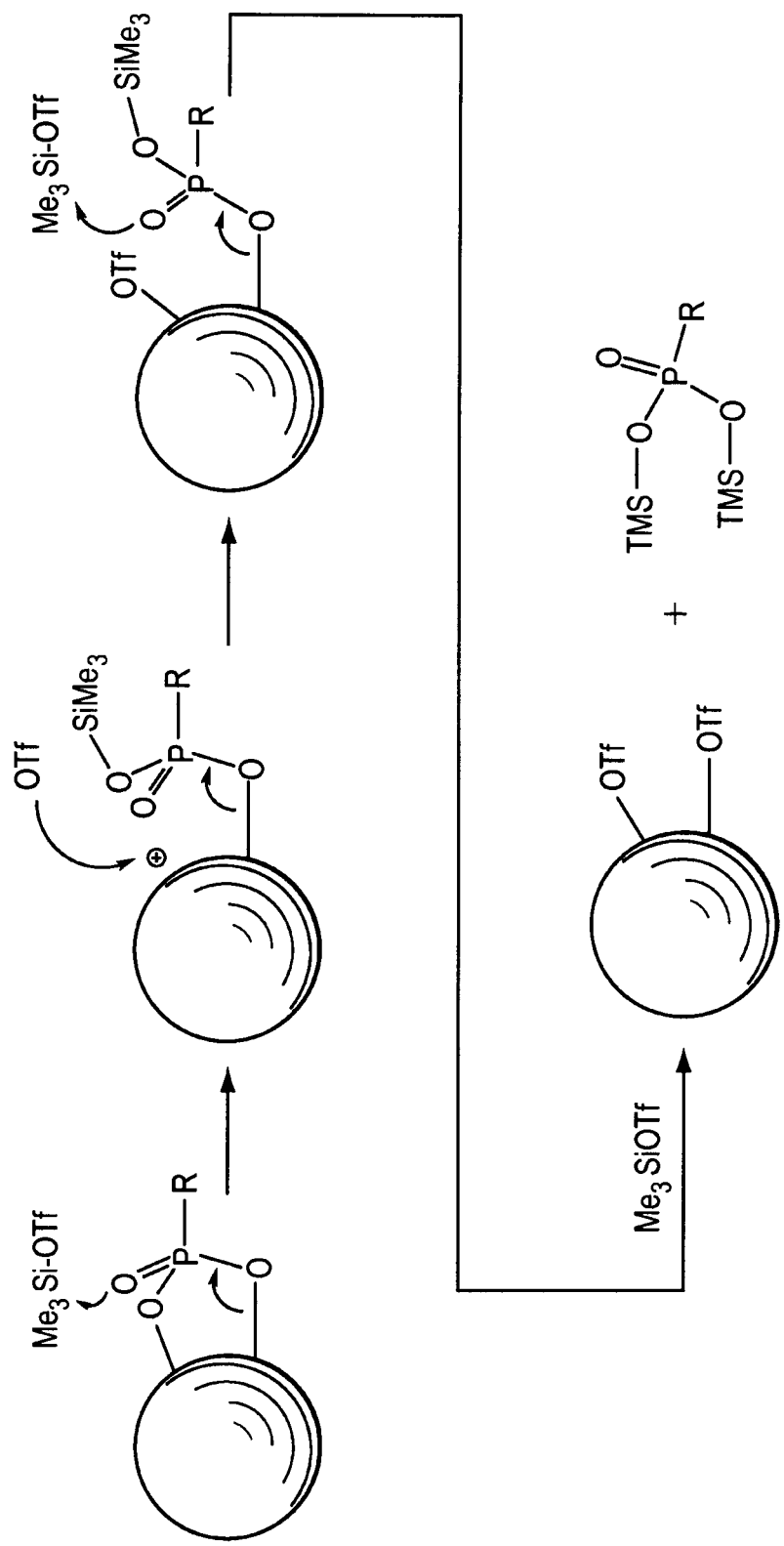
FIG. 1 depicts the replacement of a phosphonate ligand on the surface of a nanocrystal with a triflate group, and shows a proposed mechanism for the process. The shaded sphere in the figure represents a nanocrystal.

The embodiments disclosed herein may be understood more readily by reference to the following detailed description of the preferred embodiments and the Examples included herein. It is to be understood that the terminology used herein is for the purpose of describing specific embodiments only and is not intended to be limiting.

Unless defined otherwise, all technical and scientific terms used herein have the same meaning as is commonly understood by one of ordinary skill in the art to which this invention belongs.

As used herein, "a" or "an" means "at least one" or "one or more."

As used herein, "about" means that the numerical value is approximate and small variations would not significantly affect the practice of the disclosed embodiments. Where a numerical limitation is used, unless indicated otherwise by the context, "about" means the numerical value can vary by ±10% and remain within the scope of the disclosed embodiments.

As used herein, the terms "alkyl," "alkenyl" and "alkynyl" include straight-chain, branched-chain and cyclic monovalent hydrocarbyl radicals, and combinations thereof, which contain only C and H when they are unsubstituted. Examples include, but are not limited to, methyl, ethyl, isobutyl, cyclohexyl, cyclopentylethyl, 2-propenyl, 3-butynyl, and the like. The total number of carbon atoms in each such group is sometimes described herein, e.g., when the group can contain up to ten carbon atoms it may be described as 1-10C or as C1-C10 or as C1-10. When heteroatoms (such as N, O and S) are allowed to replace carbon atoms of an alkyl, alkenyl or alkynyl group, as in heteroalkyl groups, for example, the numbers describing the group, though still written as e.g. C1-C6, represent the sum of the number of carbon atoms in the group plus the number of such heteroatoms that are included as replacements for carbon atoms in the ring or chain being described.

Typically, the alkyl, alkenyl and alkynyl substituents of the embodiments described herein contain, but are not limited to, 1-10C (alkyl) or 2-10C (alkenyl or alkynyl). Sometimes they contain 1-8C (alkyl) or 2-8C (alkenyl or alkynyl). Preferably, they contain 1-6C (alkyl) or 2-6C (alkenyl or alkynyl). Sometimes they contain 1-4C (alkyl) or 2-4C (alkenyl or alkynyl). A single group can include more than one type of multiple bond, or more than one multiple bond; such groups are included within the definition of the term "alkenyl" when they contain at least one carbon-carbon double bond, and they are included within the term "alkynyl" when they contain at least one carbon-carbon triple bond.

Alkyl, alkenyl and alkynyl groups are often substituted to the extent that such substitution can chemically occur. Typical examples of substituents can include, but are not limited to, halo, acyl, heteroacyl, carboxylic acid, sulfonic acid, primary or secondary amine, thiol, hydroxyl, or an activated derivative thereof, or a protected form of one of these. Alkyl, alkenyl and alkynyl groups can also be substituted by C1-C8 acyl, C2-C8 heteroacyl, C6-C10 aryl or C5-C10 heteroaryl, each of which can be substituted by the substituents that are appropriate for the particular group.

As used herein, "acyl" encompasses groups comprising an alkyl, alkenyl, alkynyl, aryl or arylalkyl radical attached at one of the two available valence positions of a carbonyl carbon atom, e.g., —C(=O)R where R can be an alkyl, alkenyl, alkynyl, aryl, or arylalkyl group, and heteroacyl refers to the corresponding groups wherein at least one carbon other than the carbonyl carbon has been replaced by a heteroatom chosen from N, O and S. Thus heteroacyl includes, for example, —C(=O)OR and —C(=O)NR$_2$ as well as C(=O) heteroaryl, where each R is independently H, or C1-C8 alkyl.

"Aromatic" moiety or "aryl" moiety refers to a monocyclic or fused bicyclic moiety having the well-known characteristics of aromaticity; examples include, but are not limited to, phenyl and naphthyl. Similarly, "heteroaromatic" and "heteroaryl" refer to such monocyclic or fused bicyclic ring systems which contain as ring members one or more heteroatoms (such as O, S and N). The inclusion of a heteroatom permits aromaticity in 5 membered rings as well as 6 membered rings. Typical heteroaromatic systems include, but are not limited to, monocyclic C5-C6 aromatic groups such as pyridyl, pyrimidyl, pyrazinyl, thienyl, furanyl, pyrrolyl, pyrazolyl, thiazolyl, oxazolyl, and imidazolyl, and the fused bicyclic moieties formed by fusing one of these monocyclic groups with a phenyl ring or with any of the heteroaromatic monocyclic groups to form a C8-C10 bicyclic group such as indolyl, benzimidazolyl, indazolyl, benzotriazolyl, isoquinolyl, quinolyl, benzothiazolyl, benzofuranyl, pyrazolopyridyl, quinazolinyl, quinoxalinyl, cinnolinyl, and the like. Preferably aryl groups contain 6-10 ring members, and heteroaryl groups contain 5-10 ring members.

Aryl and heteroaryl moieties may be substituted with a variety of substituents including C1-C8 alkyl, C2-C8 alkenyl, C2-C8 alkynyl, C5-C12 aryl, C1-C8 acyl, and heteroforms of these, each of which can itself be further substituted; other substituents for aryl and heteroaryl moieties can include halo, OR, NR$_2$, SR, SO$_2$R, SO$_2$NR$_2$, NRSO$_2$R, NRCONR$_2$, NRCOOR, NRCOR, CN, COOR, CONR$_2$, OOCR, —C(O)R, and NO$_2$, wherein each R is independently H, or C1-C8 alkyl.

"Nanoparticle" as used herein refers to any particle with at least one major dimension in the nanosize range. Typically, a nanoparticle has at least one major dimension ranging from about 1 to 1000 nm.

Examples of nanoparticles include a nanocrystal, such as a core/shell nanocrystal, plus any tightly-associated organic coating or other material that can be on the surface of the nanocrystal. A nanoparticle can also include a bare core/shell nanocrystal, as well as a core nanocrystal or a core/shell nanocrystal having a layer of, e.g., trioctylphosphine oxide (TOPO), tetradecylphosphonic acid (TDPA), octylphosphonic acid (OPA), trioctyl phosphine (TOP) or other material that is not removed from the surface by ordinary solvation. A nanoparticle can have a layer of ligands on its surface which can further be cross-linked; and a nanoparticle can have other or additional surface coatings that modify the properties of the particle, for example, increasing or decreasing solubility in water or other solvents. Such layers on the surface are included in the term 'nanoparticle.'

"Nanocrystal" as used herein can refer to a nanoparticle made out of an inorganic substance that typically has an ordered crystalline structure. It can refer to a nanocrystal having a crystalline core (core nanocrystal), or to a core/shell nanocrystal, and may be 1-100 nm in its largest dimension, preferably between about 1 to 50 nm in its largest dimension.

A core nanocrystal is a nanocrystal to which no shell has been applied; typically it is a nanocrystal, and typically it is made of a single semiconductor material. It can have a homogeneous composition, or its composition can vary with depth inside the nanocrystal. Many types of nanocrystals are known, and methods for making a nanocrystal core and applying a shell to it are known in the art. The nanocrystals of the disclosed herein are frequently bright fluorescent nanocrystals, and the nanoparticles prepared from them are typically also bright, e.g., having a quantum yield of at least about 10%, sometimes at least 20%, sometimes at least 30%, sometimes at least 40%, and sometimes at least 50% or greater. It can be advantageous for nanocrystals to have a surface layer of ligands to protect them from degradation in use or during storage.

"Quantum dot" as used herein typically refers to a nanocrystalline particle made from a material that in the bulk is a semiconductor or insulating material, which has a tunable photophysical property in the near ultraviolet (UV) to far infrared (IR) range.

"Water-soluble" or "water-dispersable" is used herein to mean the item is soluble or suspendable in an aqueous-based solution, such as in water or water-based solutions or buffer solutions, including those used in biological or molecular detection systems as known by those skilled in the art. While water-soluble nanoparticles are not truly 'dissolved' in the sense that term is used to describe individually solvated small molecules, they are solvated and suspended in solvents that are compatible with their outer surface layer, thus a nanoparticle that is readily dispersed in water is considered water-soluble or water-dispersible. A water-soluble nanoparticle can be considered hydrophilic, since its surface is compatible with water and with water solubility.

"Hydrophobic nanoparticle" as used herein can refer to a nanoparticle that can be readily dispersed in or dissolved in a water-immiscible solvent like hexanes, toluene, and the like. Such nanoparticles are generally not readily dispersed in water.

"Hydrophilic" as used herein can refer to a surface property of a solid, or a bulk property of a liquid, where the solid or liquid exhibits greater miscibility or solubility in a high-dielectric medium than it does in a lower dielectric medium. By way of example, a material that is more soluble in methanol than in a hydrocarbon solvent such as decane would be considered hydrophilic.

"Coordinating solvents" as used herein can refer to a solvent such as TOP, TOPO, carboxylic acids, and amines, which are effective to coordinate to the surface of a nanocrystal. 'Coordinating solvents' can also include, but are not limited to, phosphines, phosphine oxides, phosphonic acids, phosphinic acids, amines, and carboxylic acids, which are often used in growth media for nanocrystals, and which form a coating or layer on the nanocrystal surface. They exclude hydrocarbon solvents such as hexanes, toluene, hexadecane, octadecene, and the like, which do not have heteroatoms that provide bonding pairs of electrons to coordinate with the nanocrystal surface. Hydrocarbon solvents that do not contain heteroatoms such as O, S, N or P to coordinate to a nanocrystal surface are referred to herein as non-coordinating solvents. It should be note that the term 'solvent' is used in its ordinary way in these terms (i.e., it refers to a medium that supports, dissolves, or disperses materials and reactions between them, but which does not ordinarily participate in or become modified by the reactions of the reactant materials). However, in certain instances, the solvent is modified by the reaction conditions. For example, TOP may be oxidized to TOPO, or a carboxylic acid may be reduced to an alcohol.

Nanoparticles can be synthesized in shapes of different complexity such as spheres, rods, discs, triangles, nanorings, nanoshells, tetrapods, nanowires and so on. Each of these geometries can have distinctive properties (e.g., spatial distribution of the surface charge, orientation dependence of polarization of the incident light wave, spatial extent of the electric field, etc.). In some embodiments, the nanocrystals disclosed herein are roughly spherical. In other embodiments, the nanocrystals disclosed herein are roughly shaped like a rod.

In some embodiments, the nanoparticle as provided herein may be a core/shell nanocrystal having a nanocrystal core covered by a semiconductor shell. The thickness of the shell can be adapted to provide desired particle properties. The thickness of the shell can also affect fluorescence wavelength, quantum yield, fluorescence stability, and other photostability characteristics.

In one aspect, provided herein is a nanocrystal having one or more sulfonate ligands attached to the surface. The sulfonate ligands can comprise an alkyl or aryl moiety linked to —SO$_3$X, where X can represent whatever the sulfonate group is attached to. For example, where the sulfonate ligand is a sulfonate anion (i.e., triflate), X would represent a nanocrystal, or the surface of a nanocrystal (See FIG. 1). Some of the sulfonate embodiments disclosed herein can also be described with reference to feature 'A' of Formula I, as set forth below.

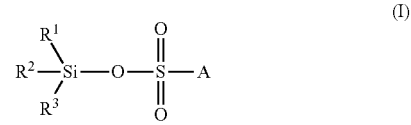

(I)

Examples of sulfonate ligands can include, but are not limited to: trifluoromethanesulfonate (triflate), fluoromethanesulfonate, methanesulfonate (mesylate), nitrophenylsulfonate (nosylate), trifluorethylsulfonate, phenylsulfonate (besylate), and toluenesulfonate (tosylate).

In preferred embodiments, the sulfonate ligands can be bound, either covalently or ionically (or somewhere in between these two bonding characteristics) to metal atoms at the surface of the outer layer of the nanocrystal. Thus, for a core/shell nanocrystal having a core coated with a semiconductor shell, the sulfonate ligands can be bound to metal atoms in the outer layer of the shell.

The phosphonate ligands (e.g., TDPA, OPA, etc.) discussed herein can comprise a hydrocarbon group linked to a phosphonate group, which can be in its ionized (anionic) form or can be an acid; when associated with a nanocrystal surface, it is typically in its ionized form but may be tightly bonded to the nanocrystal in a way that approximates a covalent bond to metal atoms of the nanocrystal surface. The phosphinate ligands discussed herein are similar, but have two hydrocarbon groups rather than one. The hydrocarbon groups for these phosphonate or phosphinate ligands are not limiting, as the reaction to replace these ligands work regardless of the nature of the organic portion of the phosphonate or phosphinate ligands. In some embodiments, the hydrocarbon group can be a C1-C24 alkyl. In other embodiments, the hydrocarbon group can be a C5-C10 aryl. In still other embodiments, the hydrocarbon group can be a heteroaryl group.

Despite the fact that phosphonate ligands tend to bind extremely tightly to the surface of the nanocrystal, they can still be readily removed by the methods disclosed herein. For example, as shown in FIG. 1, silylsulfonates can react with and replace the surface-bound phosphonate ligands due to the high affinity that the silyl groups (of the silylsulfonates) have for the oxygen atoms of the phosphonate ligand. That is, the silylsulfonates (i.e., trimethylsilyl triflate) can react with the phosphonate ligand (i.e., TDPA) to break its bonds with the surface of a nanocrystal and form sulfonate anion (i.e., triflate) reaction by-products that then replace the displaced phosphonate on the surface of the nanocrystal. Some examples of silylsulfonates that can be used can include, but are not limited to: (trimethylsilyl)triflate, (triethylsilyl)triflate, (t-butyldimethylsilyl)triflate, (phenyldimethylsily)triflate, trimethylsilyl fluoromethanesulfonate, trimethylsilyl methanesulfonate, trimethylsilyl nitrophenylsulfonate, trimethylsilyl trifluoroethylsulfonate, trimethylsilyl phenylsulfonate, trimethylsilyl toluenesulfonate, diisopropylsilyl bis (trifluoromethanesulfonate), tertbutyldimethylsilyl trifluoromethanesulfonate, triisopropylsilyl trifluoromethanesulfonate, and trimethylsilyl chlorosulfonate.

In one example, nanocrystals having a passivating layer of TDPA and dissolved in hexanes can be treated with about 200,000 equivalents of (trimethylsilyl)triflate (TMS triflate). This caused triflate-covered nanocrystals to precipitate as an orange powder, because the triflate-coated nanocrystals were not soluble in hexanes. The orange powder was easily collected and rinsed with hexanes. The resulting triflate-coated nanocrystals proved to be readily dispersible in polar organic solvents. Stable dispersions were easily formed by addition of acetonitrile, dimethylformamide (DMF), or butanol to these nanocrystals, although the dispersions exhibited a very low fluorescence quantum yield—particularly when dissolved in acetonitrile. These dispersions could be stored under inert atmosphere or under ambient conditions without any apparent degradation. This stability, combined with the presumably low binding affinity of such solvent molecules for the particle surface, made these dispersions a convenient starting material for further ligand exchange steps.

Without wishing to be bound by theory, it is believed that the sulfonate ligands bind to the metal atoms at the surface of the nanocrystal; for example, in a core/shell nanocrystal having a ZnS shell, the sulfonate ligand(s) is believed to coordinate to a Zn atom, or multiple Zn atoms, of the outer layer of the shell. This method can be used to produce nanocrystals having one surface sulfonate (e.g., triflate) ligand, or a plurality of surface sulfonate ligands, or it can be used to make nanocrystals having a surface that is substantially covered by a layer of sulfonate ligands. Portions of the surface not covered by sulfonate ligands can be occupied by other typical nanocrystal passivating ligands, such as, but not limited to: trialkylphosphines, trialkylphosphine oxides, alkylamines including amines with one, two, or three alkyl groups, alkyl carboxylates, and alkyl phosphonic acids; where each alkyl is a C1-C24 alkyl, and each ligand contains at least six carbon atoms, and preferably at least ten carbon atoms in all of its alkyl groups combined.

Therefore, in some embodiments, the surface of the core or core/shell nanocrystal or populations thereof can be coated with varying quantities of sulfonate ligands prior to further ligand exchange steps (for example, replacement with hydrophilic ligand(s). For example, sulfonate ligands can represent at least about 10%, at least about 20%, at least about 30%, at least about 40%, at least about 50%, at least about 80%, at least about 95%, at least about 98%, at least about 99%, or more of the total surface ligands coating the core/shell nanocrystals.

Formation of the sulfonate containing nanocrystal can be monitored by observing formation of the characteristic spectral features (IR, $^{19}$F nmr, etc.) of the nanocrystal-sulfonate complex, and similarly, replacement of the sulfonate group(s) can be monitored by observing disappearance of these spectral features. Alternatively, these reactions can be monitored by formation of the associated by-products: the trialkylsilyl phosphonate produced during the sulfonate-nanocrystal formation step, or the free sulfonate anion formed as the sulfonate is displaced from the nanocrystal by a nucleophilic reactant. Alternatively, especially where the sulfonate is a triflate, the reactions can be monitored by the solubility of the nanocrystal: the starting phosphonate-nanocrystal complex is typically soluble in hexanes, while the triflate complex is not, so conversion of phosphonate to triflate can result in precipitation from a solvent like hexanes.

Moreover, it has now been shown that triflate and other types of sulfonate ligands on the surface of a nanocrystal (such as in the products of the methods described above) can be replaced by other ligands that contain a nucleophilic reactant group. Molecules having an available nucleophilic reactant group can displace a sulfonate ligand from the surface of a nanocrystal under mild conditions. To demonstrate the basic efficacy of this approach, it was found that TDPA could be removed from the nanoparticle to render it insoluble in hexane and then subsequently added back onto the nanoparticle to cause redispersion. For example, it was found that treating nanocrystals with trimethylsilyl triflate caused them to precipitate from hexanes, and that purifying the solid and treating it with TDPA in hexanes caused the nanocrystals to go back into solution, and produced a nanocrystal coated with TDPA. Similarly, treatment with decylamine or dioctylamine similarly produced a soluble dispersion of nanocrystals having amine ligands on their surfaces. It was also found that when small amounts of water were added to a dichloromethane solution of dioctylamine dots, the nanoparticles immediately brightened and red-shifted markedly. This indicated that the ligand-exchange process to add the dioctylamine produced a layer of dioctylamines that was imperfect, but could easily be subsequently displaced, rearranged, or augmented by additional ligands.

Without being bound by theory as to what the mechanism is for this replacement, molecules (ligands) containing nucleophilic functional groups such as thiols, dithiols (bidentate thiols such as dihydrolipoic acid and compounds of Formula III and IV), trithiols (tridentate thiols), amines (e.g., primary, secondary or tertiary amines), hydroxyls, phosphonates, phosphinates, carboxylates, nitriles, thioesters, phosphines, phosphine oxides, phenylates, oxide ligands, nitrogenous heterocycles, such as imidazoles and pyridones, and the like can be attached to the surface of a nanocrystal by contacting a sulfonate ligand-containing nanocrystal such as those prepared by the foregoing methods with functionalized organic molecules containing such nucleophilic functional groups, with accompanying loss of sulfonate ligands from the nanocrystal surface.

The nucleophilic group of these molecules is believed to coordinate to the metal atom on the surface of a nanocrystal and replace a sulfonate ligand from the nanocrystal surface. As a result of this replacement, the surface layer of molecules on the nanocrystal can be modified to the extent the new nanocrystal ligands are different in character from the ones that were replaced, e.g., if a significant number of hydrophobic ligands are replaced by more polar or hydrophilic groups, the surface character of the nanoparticle is proportionally changed, also.

Triflate is an example of a suitable sulfonate ligand; other alkyl or aryl sulfonates like fluoromethanesulfonate, methanesulfonate (mesylate), nitrophenylsulfonate (nosylate), trifluorethylsulfonate, phenylsulfonate (besylate), toluenesulfonate (e.g., p-Tosylate), and the like, can also be used. Using other sulfonates permits increased selectivity for removal of phosphonate/phosphinate groups, and modulation of the reactivity and stability of the nanocrystal-sulfonate connection to be manipulated. For example, nanocrystals linked to mesylate or tosylate may be less reactive in this process but provide a more stable sulfonate-nanocrystal complex, that is more easily manipulated, more stable toward moisture or various solvents and isolation conditions, and is more soluble in hydrophobic solvents like hexanes than the triflate-nanocrystal compositions are. Thus, the appropriate silylsulfonate reagent can be selected based on the nucleophilic and reaction conditions employed, and whether the intermediate sulfonate ligand containing nanocrystal is to be isolated or used directly for further transformations (e.g., further ligand exchange reactions, etc.).

Suitable silylsulfonate reagents for this reaction include compounds of Formula (I):

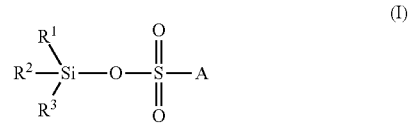

wherein $R^1$, $R^2$, $R^3$ and A are each, independently, C1-C10 alkyl or C5-C10 aryl; and each alkyl and aryl is optionally substituted.

The alkyl groups for Formula I compounds are independently selected, and can be straight chain, branched, cyclic, or combinations of these, and optionally can include a C1-C4 alkoxy group as a substituent. Typically, the alkyl groups are lower alkyls, e.g., C1-C4 alkyl groups that are linear or branched. Methyl is one suitable example.

The aryl group for the compounds of Formula I can be phenyl, naphthyl or a heteroaryl having up to 10 ring members, and can be monocyclic or bicyclic, and optionally contain up to two heteroatoms selected from N, O and S as ring members in each ring. (It will be understood by those skilled in the art that the 5-membered aryl is a heteroaryl ring.) Phenyl is a preferred aryl group; and an aryl group is typically only present if the other organic groups on the silicon other than the sulfonate are lower alkyls, and preferably they are each Me. Examples of silylsulfonate compounds include, but are not limited to: (trimethylsilyl)triflate, (triethylsilyl)triflate, (t-butyldimethylsilyl)triflate, (phenyldimethylsily)triflate, trimethylsilyl fluoromethanesulfonate, trimethylsilyl methanesulfonate, trimethylsilyl nitrophenylsulfonate, trimethylsilyl trifluoroethylsulfonate, trimethylsilyl phenylsulfonate, trimethylsilyl toluenesulfonate, diisopropylsilyl bis(trifluoromethanesulfonate), tertbutyldimethylsilyl trifluoromethanesulfonate, triisopropylsilyl trifluoromethanesulfonate, and trimethylsilyl chlorosulfonate.

The same type of sulfonate ligand exchange reaction with nanocrystal bound phosphonates/phosphinates can also be done with TMS-CN or other silylcyanides, to introduce cyano groups onto a nanocrystal. The silyl groups of suitable silylcyanides correspond to the same silyl groups used in the silylsulfonates The reactions of these silyl groups can, where desired, be accelerated by the addition of a catalytic amount of a sulfonate to assist in the substitution reaction; or a catalytic amount of a Lewis acid salt such as a $Zn^{2+}$ salt; or a combination of these Zinc salts can be particularly suitable for use in these reactions, including zinc halides (chloride, bromide or iodide), alkylcarboxylates (especially trifluoroacetate), and sulfonates (triflate, mesylate, besylate, tosylate, etc.).

The exchange can be performed in any solvent in which the phosphonate-containing nanocrystal or the sulfonated nanocrystal product is soluble; solvents such as C5-C20 hydrocarbons are often used; halogenated solvents like dichloromethane, freons, chloroform, trichloroethane, carbon tetrachloride and trichloroethylene can be used; and aromatic solvents like benzene, toluene, and xylenes can be used. The reaction can be performed at any temperature where the reaction rate is found to be acceptable; frequently it is done between about 0° C. to about 80° C., preferably around 0° C. to about 40° C.

In some embodiments, a nanocrystal having at least one sulfonate group on its surface is provided. Optionally, the nanocrystal can have a plurality of sulfonate groups on its surface. In some embodiments, the majority of the surface of the nanocrystal is covered with sulfonate groups. Therefore, in some embodiments, the surface of the core or core/shell nanocrystal or populations thereof can be coated with varying quantities of sulfonate ligands prior to further ligand exchange steps (for example, replacement with hydrophilic ligand(s). For example, sulfonate ligands can represent at least about 10%, at least about 20%, at least about 30%, at least about 40%, at least about 50%, at least about 80%, at least about 95%, at least about 98%, at least about 99%, or more of the total surface ligands coating the core/shell nanocrystals.

In some embodiments, the nanoparticle having at least one sulfonate group on its surface can be a core nanocrystal. In other embodiments, it can be a core/shell nanocrystal.

The nanocrystal core and shell can be made of any suitable metal and non-metal atoms that are known to form nanocrystals. Suitable semiconductor materials for the core and/or shell include, but are not limited to, ones including Group 2-16, 12-16, 13-15 and 14 element-based semiconductors such as ZnS, ZnSe, ZnTe, CdS, CdSe, CdTe, HgS, HgSe, HgTe, MgS, MgSe, MgTe, CaS, CaSe, CaTe, SrS, SrSe, SrTe, BaS, BaSe, BaTe, GaN, GaP, GaAs, GaSb, InP, InAs, InSb, AlAs, AlP, AlSb, PbS, PbSe, Ge and Si and ternary and quaternary mixtures thereof. Typically, the core and the shell of a core/shell nanocrystal are composed of different semiconductor materials, meaning that at least one atom type of a binary semiconductor material of the core of a core/shell is different from the atom types in the shell of the core/shell nanocrystal.

Nanocrystals can be characterized by their percent quantum yield of emitted light. For example, the quantum yield can be greater than about 10%, greater than about 20%, greater than about 30%, greater than about 40%, greater than about 50%, greater than about 60%, greater than about 70%, greater than about 80%, greater than about 90%, and ranges between any two of these values. The quantum yield is typically greater than about 30%, and preferably greater than 50% or greater than 70%.

In some embodiments, the metal atoms of a shell layer on a nanocrystal core are selected from Cd, Zn, Ga, Mg, Al, Cr, Mn, Fe, Co, Ni, Cu, Si, and the lanthanides. The second element in these semiconductor shell layers can be selected from S, Se, Te, P, As, N, O and Sb.

The nanocrystal can be of any suitable size; typically, it is sized to provide fluorescence in the UV-Visible portion of the electromagnetic spectrum, since this range is convenient for use in monitoring biological and biochemical events in relevant media. The relationship between size and fluorescence wavelength is well known, thus making nanoparticles smaller may require selecting a particular material that gives a suitable wavelength at a small size, such as InP as the core of a core/shell nanocrystal designed to be especially small. In frequent embodiments, the nanocrystals described herein can be from about 1 nm to about 100 nm in diameter, sometimes from about 1 to about 50 nm in diameter, and sometimes from about 1 to about 25 nm in diameter. For a nanocrystal that is not substantially spherical, e.g. rod-shaped, it can be from about 1 to about 100 nm, or from about 1 nm to about 50 nm or 1 nm to about 25 nm in its smallest dimension.

Where a core/shell fluorescent nanocrystal is used, it is sometimes advantageous to make the nanoparticle as small as practical; thus in some embodiments, the nanocrystal is less than about 10 nm in diameter, and often less than about 8 nm, and sometimes less than about 6 nm in diameter, and in some preferred embodiments, the nanocrystal is less than about 5 nm in diameter (or size), or less than about 4 nm, about 3 nm, about 2 nm, or about 1 nm in diameter or size.

Generally, a nanocrystal is a semiconductive particle, having a diameter or largest dimension in the range of about 1 nm to about 100 nm, or in the range of about 2 nm to about 50 nm, and in certain embodiments, in the range of about 2 nm to about 20 nm or from about 2 to about 10 nm. More specific ranges of sizes for nanocrystals can include, but are not limited to: about 0.5 nm to about 5 nm, about 1 nm to about 50 nm, and about 1 nm to about 20 nm Specific size examples include about 0.1 nm, about 0.5 nm, about 1 nm, about 2 nm, about 3 nm, about 4 nm, about 5 nm, about 6 nm, about 7 nm, about 8 nm, about 9 nm, about 10 nm, about 11 nm, about 12 nm, about 13 nm, about 14 nm, about 15 nm, about 16 nm, about 17 nm, about 18 nm, about 19 nm, about 20 nm, about 25 nm, about 30 nm, about 35 nm, about 40 nm, about 45 nm, about 50 nm, and ranges between any two of these values. In some embodiments, a core nanocrystal can be less than about 10 nm in diameter, or less than about 7 nm in diameter, or less than about 5 nm in diameter.

In some embodiments, a nanocrystal core can be less than about 10 nm in diameter, less than about 7 nm in diameter, or less than about 5 nm in diameter. The small size of these nanocrystals can be advantageous in many applications, particularly because the nanocrystals disclosed herein are unexpectedly bright for their size.

A typical single-color preparation of nanoparticles has crystals that are preferably of substantially identical size and shape. Nanocrystals are typically thought of as being spherical or nearly spherical in shape, but can actually be any shape. Alternatively, the nanocrystals can be non-spherical in shape. For example, the nanocrystal's shape can change towards oblate spheroids for redder colors. It is preferred that at least about 60%, at least about 70%, at least about 80%, at least about 90%, at least about 95%, and ideally about 100% of the particles are of the same size. Size deviation can be measured as root mean square ("rms") of the diameter, with less than about 30% rms, preferably less than about 20% rms, more preferably less than about 10% rms. Size deviation can be less than about 10% rms, less than about 9% rms, less than about 8% rms, less than about 7% rms, less than about 6% rms, less than about 5% rms, or ranges between any two of these values. Such a collection of particles is sometimes referred to as being "monodisperse". One of ordinary skill in the art will realize that particular sizes of nanocrystals, such as of nanocrystals, are generally obtained as particle size distributions.

It is well known that the color (emitted light) of the nanocrystal can be "tuned" by varying the size and composition of the nanocrystal. Nanocrystals can absorb a wide spectrum of wavelengths, and emit a narrow wavelength of light. The excitation and emission wavelengths are typically different, and non-overlapping. The nanoparticles of a monodisperse population may be characterized in that they produce a fluorescence emission having a relatively narrow wavelength band. Examples of emission widths (FWHM) include less than about 200 nm, less than about 175 nm, less than about 150 nm, less than about 125 nm, less than about 100 nm, less than about 75 nm, less than about 60 nm, less than about 50 nm, less than about 40 nm, less than about 30 nm, less than about 20 nm, and less than about 10 nm. The width of emission is preferably less than about 50 nm, and more preferably less than about 20 nm at full width at half maximum of the emission band (FWHM). The emitted light preferably has a symmetrical emission of wavelengths. The emission maxima can generally be at any wavelength from about 200 nm to about 2,000 nm. Examples of emission maxima can include, but are not limited to: about 200 nm, about 400 nm, about 600 nm, about 800 nm, about 1,000 nm, about 1,200 nm, about 1,400 nm, about 1,600 nm, about 1,800 nm, about 2,000 nm, and ranges between any two of these values.

Frequently, the fluorescence of a monodisperse population of the nanocrystals disclosed herein is characterized in that when irradiated the population emits light for which the peak emission is in the spectral range of from about 370 nm to about 1200 nm, sometimes from about 370 nm to about 900 nm, and sometimes from about 470 nm to about 620 nm.

The nanoparticles can have surface coatings adding various functionalities. For example, the nanocrystals can be coated with lipids, phospholipids, fatty acids, polynucleic acids, polyethylene glycol, primary antibodies, secondary antibodies, antibody fragments, protein or nucleic acid based aptamers, biotin, streptavidin, proteins, peptides, small organic molecules, organic or inorganic dyes, precious or noble metal clusters.

Spectral characteristics of nanoparticles can generally be monitored using any suitable light-measuring or light-accumulating instrumentation. Examples of such instrumentation are CCD (charge-coupled device) cameras, video devices, CIT imaging, digital cameras mounted on a fluorescent microscope, photomultipliers, fluorometers and luminometers, microscopes of various configurations, and even the human eye. The emission can be monitored continuously or at one or more discrete time points. The photostability and sensitivity of nanoparticles allow recording of changes in electrical potential over extended periods of time.

The nanoparticles disclosed herein frequently comprise a core/shell nanocrystal comprising a nanocrystal core covered by a semiconductor shell characterized by its thickness. The thickness of the shell can be adjusted to provide desired particle properties. The thickness of the shell can affect fluorescence wavelength, quantum yield, fluorescence stability, and other photostability characteristics.

In some embodiments, a core nanocrystal is modified to enhance the efficiency and stability of its fluorescence emissions, prior to ligand modifications described herein, by adding an overcoating layer or shell to the nanocrystal core to form a core/shell nanocrystal. Having a shell may be preferred, because surface defects at the surface of the nanocrystal can result in traps for electrons, or holes that degrade the electrical and optical properties of the nanocrystal core, or other non-radiative energy loss mechanisms that either dissipate the energy of an absorbed photon or at least affect the wavelength of the fluorescence emission slightly, resulting in broadening of the emission band. An insulating layer at the surface of the nanocrystal core can provide an atomically abrupt jump in the chemical potential at the interface that eliminates energy states that can serve as traps for the electrons and holes. This results in higher efficiency in the luminescent processes.

Suitable materials for the shell include semiconductor materials having a higher bandgap energy than the nanocrystal core. In addition to having a bandgap energy greater than the nanocrystal core, suitable materials for the shell should have good conduction and valence band offset with respect to the core nanocrystal. Thus, the conduction band is desirably higher and the valence band is desirably lower than those of the core nanocrystal. For nanocrystal cores that emit energy in the visible (e.g., CdS, CdSe, CdTe, ZnS, ZnSe, ZnTe, GaP, GaAs, GaN) or near IR (e.g., InP, InAs, InSb, PbS, PbSe), a material that has a bandgap energy in the ultraviolet regions may be used. Exemplary shell materials include, but are not limited to: CdS, CdSe, InP, InAs, ZnS, ZnSe, ZnTe, GaP, GaN, and magnesium chalcogenides, e.g., MgS, MgSe, and MgTe. For a nanocrystal core that emits in the near IR, materials having a bandgap energy in the visible, such as CdS or CdSe, can also be used. The preparation of a coated nanocrystal may be found in, e.g., Dabbousi et al. (1997) *J. Phys. Chem. B* 101:9463, Hines et al. (1996) *J. Phys. Chem.* 100: 468-471, Peng et al. (1997) *J. Am. Chem. Soc.* 119:7019-7029, and Kuno et al. (1997) *J. Phys. Chem.* 106:9869. It is also understood in the art that the actual fluorescence wavelength for a particular nanocrystal core depends upon the size of the core as well as its composition, so the categorizations above are approximations, and nanocrystal cores described as emitting in the visible or the near IR can actually emit at longer or shorter wavelengths depending upon the size of the core.

In some embodiments, the metal atoms of the nanocrystal to which the sulfonate ligand binds are in a shell layer on a nanocrystal core, and are selected from Cd, Zn, Ga and Mg. Other suitable metal atoms in the shell layer include Al, Cr, Mn, Fe, Co, Ni, Cu, Si, and the lanthanides. The second element in these semiconductor shell layers is frequently selected from S, Se, Te, P, As, N, O and Sb. Some preferred shell materials include ZnS, ZnSe, CdS, CdSe, and MgS. Examples of other suitable shell materials include metal oxides (e.g., MnO, CoO, $SiO_2$), metal arsenides (e.g., InAs), metal phosphides (e.g., InP) and metal antimonides (e.g., InSb).

In some embodiments, the core of a core/shell nanocrystal comprises metal atoms selected from Zn, Cd, In, Ga, and Pb. Other suitable metal atoms in the core layer include Al, Cr, Mn, Fe, Co, Ni, Cu, Si, and the lanthanides. The second element in these core layers is frequently selected from S, Se, Te, P, As, N, O and Sb. Some preferred nanocrystal cores include metal sulfides (e.g., ZnS or CdS), metal selenides (e.g., ZnSe or CdSe), and metal tellurides (e.g., ZnTe or CdTe). Other nanocrystal cores include metal oxides (e.g., MnO, CoO, $SiO_2$), metal arsenides (e.g., InAs), metal phosphides (e.g., InP) and metal antimonides (e.g., InSb). Specific examples of preferred nanocrystal cores include CdS, CdSe, CdTe, InP, InAs, GaP, ZnS, ZnSe and ZnTe.

The nanocrystals comprising one or more sulfonate ligands on their surface can be made by treating a nanocrystal having an organophosphorus ligand comprising a phosphonate or a phosphinate on its surface with a silylsulfonate reagent. The organosilyl groups of the silylsulfonate can contain any suitable alkyl groups, and one of the organic groups on the silyl can be an aryl group. In some embodiments, the silylsulfonate is a (trialkylsilyl)sulfonate or a (dialkylarylsilyl)sulfonate, wherein the alkyl groups are C1-C10 alkyl or C1-C4 (lower) alkyl groups; and the alkyl groups can be the same or different. Preferably, the silyl group is trimethylsilyl, which can be paired with any suitable sulfonate groups. Triflate, mesylate, besylate, nosylate, brosylate, and tosylate are preferred sulfonate groups. A particularly preferred embodiment of the silylsulfonate reagent of Formula (I) can be (trimethylsilyl) triflate (i.e., TMS-OTf: Tf represents the triflyl group, $CF_3SO_2$—, and OTf is commonly used as a shorthand for the triflate group, $CF_3SO_3$—). Triethylsilyl, t-butyldimethylsilyl and phenyldimethylsilyl are also suitable organosilyl groups for silyl sulfonates, and in particular silyl triflates, useful in the methods disclosed herein.

Also provided herein are methods of using sulfonate ligand-coated nanoparticles to make other types of nanoparticles. In one aspect, a method to make a water-soluble nanoparticle starting with a hydrophobic nanoparticle, by replacing at least some hydrophobic ligands on the nanocrystal with hydrophilic ones, is disclosed. This replacement is done in two steps. First, at least some of the hydrophobic ligands of the nanoparticle are removed from the nanocrystal surface, and are replaced by a reactive functional ligand, e.g, sulfonate ligand. Second, the reactive functional ligand(s) are then replaced by a nucleophilic molecule having the desired properties. The activated nanocrystals (resulting from the first step) comprising a sulfonate ligand on their surface, and preferably a triflate ligand on their surface, (e.g., (triflate)$_x$-Nanocrystal, where x is between 1 and about 1,000; and preferably x is between about 4 and about 500, and more preferably between about 20 and about 400) are believed to be novel compositions.

Further provided herein is a novel method to modify the surface and/or the surface properties of a nanoparticle; comprising at least one phosphinate or phosphonate ligand on a nanocrystal surface. A desired surface property can be provided by using the methods described herein to introduce ligands that provide the desired surface property. In some embodiments, the desired surface property is water solubility. In other embodiments, the desired property is solubility in a polar protic solvent. In still other embodiments, the desired property is pH responsiveness or a suitable surface pKa, or having at least one ionizable group that will be either protonated or deprotonated (i.e., charged) at a specified pH. Thus the method can be used to modulate the pI of the nanoparticles by introducing ionizable groups onto the nanocrystal surface. In some embodiments, the desired property is an ability to easily link to a target molecule via a peptide bond to the target molecule, which can be achieved by having a carboxylate or a primary amine, for example, available on a ligand added by the methods of the invention.

Typically, the nanocrystal used for this process is a core/shell nanocrystal that is initially coated with a hydrophobic ligand such as trioctylphosphine oxide (TOPO), tetradecylphosphonic acid (TDPA), octylphosphonic acid (OPA), trioctyl phosphine (TOP), and the like, or a mixture of such ligands. The layer of hydrophobic surface ligands on the nanocrystal includes at least one phosphonate and/or phosphinate ligand for purposes of the disclosed embodiments. Preferably, the surface layer comprises a plurality of phosphonate and/or phosphinate ligands. The hydrophobic ligands typically have at least one long-chain alkyl group, i.e., an alkyl group having at least 8 carbons, or for the phosphine/phosphine oxide ligands, this hydrophobic character may be provided by two or three alkyl chains on a single ligand molecule having a total of at least 10 carbon atoms. The alkyl group can be straight chained or branched or cyclic, or a combination of these.

However, it is not required for the disclosed methods and compositions that the nanoparticle must be hydrophobic, since the reaction with phosphonate and/or phosphinate ligands is not dependent upon the other ligands that may be present on the nanoparticle, and in some embodiments, the nanoparticle comprises ligands that have shorter alkyl groups, and can thus be less hydrophobic; e.g., C1-C24 alkyl groups can be used on the ligands of the surface layer.

The surface layer of nanoparticles useful in the embodiments disclosed herein can include one or more phosphonate or phosphinate ligands. These are typically hydrophobic ligands as discussed above; however, they can also be shorter-chain alkyl phosphonates or aryl phosphonates, or alkyl or aryl phosphinates; thus the phosphonate and phosphinate ligands for purposes of the embodiments disclosed herein can be provided by C1-C24 organophosphonic or organophosphinic acids, where the C1-C24 organic group comprises alkyl and/or phenyl groups. It has been found that the phosphonate and phosphinate ligands bind very tightly to a nanocrystal, and they are not easily removed under typical ligand replacement conditions In some embodiments, at least 10% of the ligand molecules (i.e., 10 mole-percent) of the ligand molecules used in making the shell of the core/shell nanocrystal comprise a phosphonate, phosphinate, and/or carboxylate group. In other embodiments, at least about 20 mole-percent of the ligand molecules used in making the shell of the core/shell nanocrystal comprise a phosphonate and/or phosphinate. In other embodiments, at least about 30 mole-percent of the ligand molecules used in making the shell of the core/shell nanocrystal comprise a phosphonate and/or phosphinate. In other embodiments, at least about 40 mole-percent of the ligand molecules used in making the shell of the core/shell nanocrystal comprise a phosphonate and/or phosphinate. In other embodiments, at least about 50 mole-percent of the ligand molecules used in making the shell of the core/shell nanocrystal comprise a phosphonate and/or phosphinate. In other embodiments, at least about 70 mole-percent of the ligand molecules used in making the shell of the core/shell nanocrystal comprise a phosphonate and/or phosphinate. In other embodiments, at least about 90 mole-percent of the ligand molecules used in making the shell of the core/shell nanocrystal comprise a phosphonate and/or phosphinate.

It should be understood, however, that it is not necessary for the majority of the ligands present in the shell formation mixture to be phosphinate and/or phosphonate groups: because of the very high affinity phosphonate/phosphinate groups have for the surface of nanocrystals, even if only about 10% of the ligand present is a phosphonate and/or phosphinate, its high affinity will ensure that the phosphonate/phosphinate present is coordinated tightly to the nanocrystal. Thus shell-forming mixtures containing more than about 5% phosphonic/phosphinic acid will often provide nanocrystals wherein the surface ligands are primarily if not entirely phosphonates/phosphinates: other ligands like TOP and TOPO do not compete well with the high affinity of, e.g., TDPA.

The requisite phosphonate and/or phosphinate ligands are typically introduced into the nanoparticle by including them in the reaction mixture where the nanocrystal shell is formed on the nanocrystal core. Methods for making nanocrystal shells in the presence of a phosphonic acid, such as tetradecyl phosphonic acid (TDPA) are known in the art; and modification of those methods to use other phosphonic acids is routine. Such methods include using TDPA as a solvent or component of a solvent for making a semiconductor shell on a nanocrystal core. See, e.g., Treadway, et al., U.S. Pat. No. 7,172,791. It has been observed that nanocrystals grown in the presence of alkylphosphonates like TDPA typically are nearly entirely coated with alkylphosphonate ligands even though the TDPA is accompanied by many other ligands in the nanocrystal formation reaction. Thus, even though TDPA was a minor component of a shell-forming reaction that included larger amounts of TOP or TOPO, NMR examination of the nanoparticle produced have shown that no detectable amount of TOP or TOPO was present on the nanocrystal surface: TDPA out-competed the more plentiful other ligands, apparently due to its higher affinity for binding to the nanocrystal surfaces.

The phosphonate/phosphinate ligand(s) on a nanocrystal can be replaced by a sulfonate group (or groups) by contacting the nanocrystal-phosphonate/phosphinate composition with a silylsulfonate reagent, such as TMS-OTf (trimethylsilyl triflate, or TMS triflate). Typically, this contacting step is conducted in an organic solvent that is inert towards the sulfonate reagent (i.e., a non-nucleophilic solvent). The reaction can typically be conducted in an aprotic solvent, with careful exclusion of moisture and protic solvents, and can be conducted in an inert atmosphere that substantially excludes oxygen. Suitable solvents for this step can include, for example, hydrocarbon solvents such as hexanes, cyclohexane, heptane, decane, benzene, toluene, xylene and the like; halogenated solvents such as dichloromethane, chloroform, carbon tetrachloride, or fluorochlorocarbons; and ethereal solvents such as diethyl ether, dipropyl ether, DME, MTBE, diisopropyl ether, THF, tetrahydropyran and dioxane.

In one aspect, provided herein is a method to make a nanocrystal having a sulfonate ligand on its surface, comprising (1) providing a nanocrystal whose surface comprises a phosphonate/phosphinate ligand; and (2) contacting the nanocrystal with a silylsulfonate reagent in an organic solvent. The sulfonate ligand can be an alkyl or aryl sulfonate of Formula I, and in some embodiments it is a triflate.

The reaction can be driven by the interaction between the silicon of the TMS triflate and the oxygen of the phosphonate/phosphinate, and can thus occur for a range of silylsulfonate reactants, in addition to TMS triflate. Other alkyl groups on the silyl group are tolerated, especially small alkyls; and at least one larger group on the silyl group can be used, e.g., t-butyl or phenyl (TMS and TBDPS). Larger groups can be used to moderate the rate of the reaction or to increase selectivity of the reaction with phosphonate/phosphinate ligands.

A variety of different silylsulfonates can be used, including, but not limited to: tri(C1-C4 alkyl)silyl triflates, (t-butyldimethylsilyl)triflate, (phenyldimethylsily)triflate, diisopropylsilyl bis(trifluoromethanesulfonate), and tertbutyldimethylsilyl trifluoromethanesulfonate. Trimethylsilyl triflate is a preferred silyl triflate. Any suitable solvent that is compatible with the phosphonate-containing nanoparticle can also be used for the reaction with the silyl triflate. Some suitable solvents include hydrocarbons such as hexanes, heptane, octane, decane, cyclohexane, and the like; aromatic hydrocarbons such as benzene, toluene, xylene, chlorobenzene, and the like; and halogenated solvents such as dichloromethane, chloroform, trichloroethane, perchloroethylene, carbon tetrachloride, and chlorofluorocarbons; ethereal solvents like MTBE, diethyl ether diisopropyl ether, dibutyl ether, THF, dioxane and the like. In some embodiments, the nanocrystal comprising a phosphonate/phosphinate layer is a core/shell nanocrystal that has one or more phosphonate/phosphinate ligands on its surface; and the product of the method is a core/shell nanocrystal having one or more triflate groups on the surface of the shell. In some embodiments, the phosphonate/phosphinate on the surface of the nanocrystal is a $C_1$-$C_{20}$ alkylphosphonate, such as TDPA. However, the methods disclosed herein are also useful to remove and replace functionalized phosphonate and/or phosphinate ligands.

The step of contacting the phosphonate/phosphinate-containing nanoparticle can be conducted in any suitable organic solvent, and at any suitable temperature. The reaction can be performed at room temperature, or at a temperature between about 0° C. and the boiling point of the organic solvent being used. Frequently, it can be conducted between about 20° C. and 80° C.

The silylsulfonate reagent can be used in any suitable amount, and often is used in at least a five molar excess relative to the amount of phosphonate/phosphinate present. In many embodiments, a larger excess is used, such as at least 1,000 equivalents, at least 10,000 equivalents, at least 100,000 equivalents, or about 200,000 equivalents. Commonly, the amount is between about 0.01 M and 2 M in the total reaction volume, or between about 0.05 M and 0.5 M. However, an amount that is insufficient to remove all phosphonate/phosphinate ligands can be used in some embodiments; then the resultant nanocrystal will have a mixture of residual phosphonate/phosphinate and sulfonate ligands on its surface.

The reaction can be conducted for any suitable time period, such as between about 5 minutes and 24 hours, or between about 15 minutes and about 4 hours. Suitable reaction times and conditions can be determined by monitoring the formation of the silyl phosphonate (or phosphinate) that is produced by the reaction between the phosphonate/phosphinate-containing nanoparticle and the silylsulfonate. When an excess of TMS triflate is used, the reaction can typically be completed in a matter of seconds or minutes at room temperature.

In some embodiments the method comprises isolating the sulfonate ligand-containing nanocrystal. The isolation can be conducted by known methods, such as precipitation, filtration, dialysis, and the like. Preferably, when the sulfonate ligand-containing nanocrystal is isolated, it is kept substantially protected from exposure to moisture, and is optionally also substantially protected form exposure to oxygen.

In another aspect, provided herein is a method to attach a functionalized organic molecule (ligand) to the surface of a nanocrystal, where the method comprises contacting a nanocrystal having a sulfonate ligand bonded to its surface with a functionalized organic molecule that comprises at least one available nucleophilic reactant group.

Examples of suitable nucleophilic functional groups, include without limitation, thiols, dithiols (bidentate thiols), trihiols (tridentate thiols), hydroxyls, alcohols, phosphonates, phosphinates, carboxylates, nitriles, thioesters, phosphines, phosphine oxides, phenylates, oxide ligands, nitrogenous heterocycles, such as imidazoles and pyridones, and the like. The nanocrystal—sulfonate composition can be a nanoparticle, or populations thereof, made by the methods disclosed above containing at least one sulfonate ligand on its surface.

As explained herein, a nucleophilic reactant group can displace a sulfonate ligand from a nanocrystal surface. This replacement reaction is typically conducted in an organic solvent, and can be conducted at a room temperature or an elevated temperature, such as 30-100° C., preferably between 40° and 60° C.; or it can be conducted at a temperature below room temperature, such as between about 0° C. and 20° C.

Such further transformations can be used to introduce onto the surface of a nanocrystal a selected target (cargo) molecule of interest, such as an antibody or other specific affinity molecule. Methods for attaching such affinity molecules to a fluorescent carrier are known in the art and can readily be modified for use in the present methods: see, e.g., U.S. Pat. No. 6,423,551, which also describes some bi-functional agents that can be used to link the surface of a nanocrystal to a target molecule and to a nanocrystal surface. These methods can also be used to introduce a number of, or a layer of, functionalized molecules (ligands) on the surface of a nanocrystal, where the functionalized molecules (ligands) can provide new surface properties to the nanoparticle, such as water-dispersability.

Therefore, in another aspect, a method for making a water-dispersable nanoparticle or population thereof, is provided, comprising:
a) providing a sulfonate ligand coated nanocrystal dispersed in a solvent;
b) contacting the sulfonate ligand coated nanocrystal with a functionalized organic molecule comprising at least one nanocrystal surface attachment group;
c) contacting the nanocrystal dispersion with an aqueous solution to form a biphasic mixture having an aqueous phase and a non-aqueous phase; and
d) maintaining the biphasic mixture under conditions that cause the nanocrystal to migrate from the non-aqueous phase into the aqueous phase.

Any suitable solvent can be used for the steps described above. Suitable solvents are those organic solvents that can dissolve or suspend the nanoparticle to be used, and may depend in part on what other ligands besides sulfonate are present. Nanoparticles having a coating largely comprised of sulfonate ligands are soluble in polar organic solvents, such as ethyl acetate, THF, ether, MTBE, dioxane; halogenated solvents such as dichloromethane, chloroform, carbon tetrachloride, trichloroethylene, and the like; and aromatic hydrocarbons such as toluene, chlorobenzene, and xylene. If a larger proportion of hydrophobic ligands are present along with the sulfonate(s), those ligands may determine the solubility properties of the nanoparticle, making it also soluble in hydrocarbon solvents like hexane, cyclohexane, octane, decane, and the like.

Any suitable molecule (ligand) containing an available nucleophilic reactant group can be used to replace the sulfonate ligand from the nanocrystal surface. In some embodiments, the available nucleophilic reactant group is selected from a primary amine, a secondary amine, a tertiary amine, a thiol, a carboxylate, cyanide, a phosphonate, and a hydroxyl.

The nanocrystal produced by the methods herein may comprise a water-solubilizing organic group comprising 1 to 1000 atoms, the atoms selected from H, C, N, O, S, P, Si, and halo, and preferably contains sufficient amount of water-solubilizing groups to make the nanoparticle as a whole water dispersable. The water-solubilizing group can be present on the nanoparticle initially and retained throughout the process because it is not linked to the nanocrystal by a phosphonate/phosphinate and is thus not susceptible to removal under the ligand-exchange methods described herein; or it can be added to the nanoparticle by the sulfonate ligand-replacement methods described herein.

The molecules used in these methods can comprise one or more of these groups, as well as other functional groups. In some embodiments, the functionalized organic molecules used to displace or replace the sulfonate ligands on a nanocrystal surface further comprise one or more polar functional groups that promote water solubility. Suitable groups for this purpose include amines, carboxylates, phosphonates, amides, hydroxyls, polar heterocycles, such as imidazoles and pyridones, and the like. One or more of such functional groups can be present on the molecules of interest.

The number of molecules (ligands) attached to the nanocrystal by the methods disclosed herein is large enough to impart water solubility to the nanoparticle produced in some embodiments. In some embodiments, only enough sulfonate ligands are replaced to make the nanoparticle water soluble; this can be done by replacing only a small number of phosphonate or phosphinate ligands with sulfonate ligands, then replacing the sulfonate ligands with hydrophilic ligands or charged ligands having a positive or negative charge at a neutral pH, i.e., between pH 6 and 8. In these embodiments, the nanoparticle may retain some phosphonate or phosphinate ligands, too. However, in other embodiments, the ligand replacement methods are used to replace all or substantially all of the phosphonate/phosphinate ligands with sulfonates, and ultimately with other ligands.

The methods disclosed herein can be used to remove all phosphonate/phosphinate ligands and replace them in one step; or the phosphonate and/or phosphinate ligands can be partially removed, and replaced by sulfonate ligands, and then the sulfonate ligands can be replaced. In some embodiments, the remaining phosphonate or phosphinate ligands can then be replaced by repeating the methods disclosed herein. Thus in some embodiments, an iterative application of this incomplete phosphonate-replacement process, is provided.

However, it has also been observed that replacing only some hydrophobic ligands on a nanocrystal surface with hydrophilic ligands may have undesired consequences. For example, the nanoparticle may be very pH sensitive with regard to its solubility properties if its solubility is dependent upon a small number of charged groups, or similarly sensitive to small amounts of ligand loss or of interactions with other species in an assay mixture or biochemical system. In addition, a limited number of hydrophilic ligands may be scattered over the nanoparticle and thus may be difficult to cross-link by methods that require using functionality of the hydrophilic ligand for cross-linking. Thus, in preferred embodiments, the process is often used to remove and replace essentially all of the phosphonate and/or phosphinate ligands present on the nanocrystal surface.

In other embodiments, only one or a few of the phosphonate or phosphinate ligands are replaced by sulfonate ligands on a nanocrystal, and the molecules can be used to attach the nanoparticle to a target or cargo molecule. For example, in such embodiments the nanoparticle may be used as a fluorescent label on a nucleic acid, antibody, or enzyme, and it may be preferable to attach one or at most a few such cargo molecules to the nanoparticle.

In some embodiments, the functionalized organic molecule (ligand) used in the replacement reaction with the nanocrystal comprises one or more available nucleophilic reactant groups such as a thiol (monodentate thiol), or two or more thiols (e.g., bidentate or tridentate thiols). Molecules comprising two or more thiol groups and a polar functional group are especially preferred; for example, dihydrolipoic acid (DHLA) can be used, or another dithiol comprising a carboxylic acid, carboxylate ester, or carboxamide can be used; or a dithiol comprising a PEG moiety having 2-50 or more poly-ethyleneglycol subunits can be used. These polar groups can provide increased water solubility for the nanoparticle; the PEG moieties can be especially effective for protecting the nanoparticle while imparting water solubility and deterring nonspecific binding in biochemical systems. Each PEG moiety can be further substituted to provide an amine or carboxylate or other additional functional group, too, and this additional functional group can be used to link the nanoparticle to a target molecule (ligand) or other construct that is to be tracked by using the nanoparticle as a fluorescent label.

Figure 2:
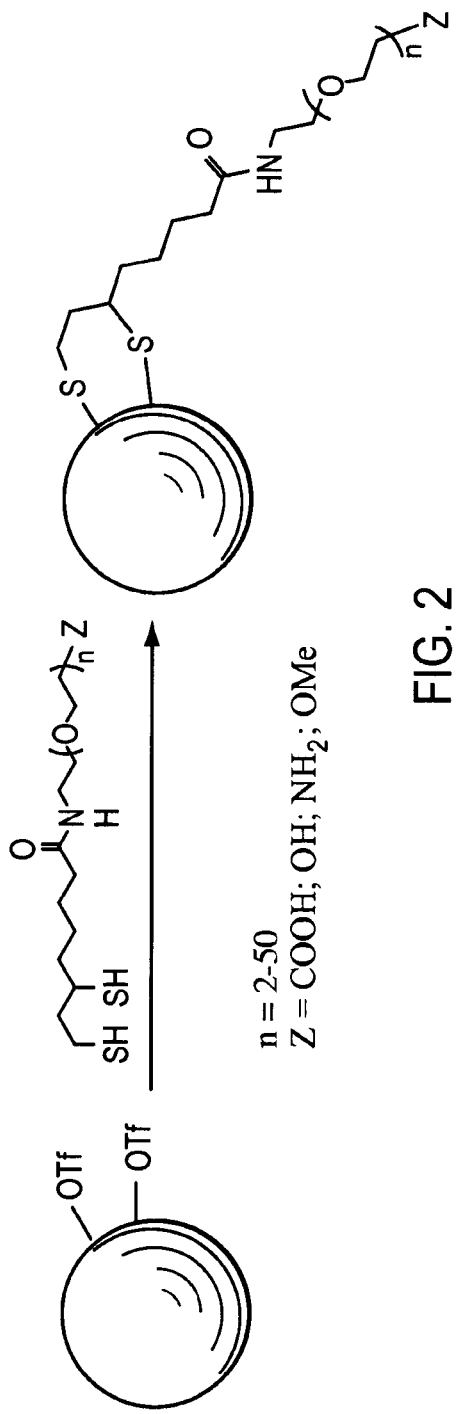
FIG. 2 is a reaction scheme for the attachment of pre-functionalized dithiol ligand to sulfonate coated nanocrystal.
Figure 3:
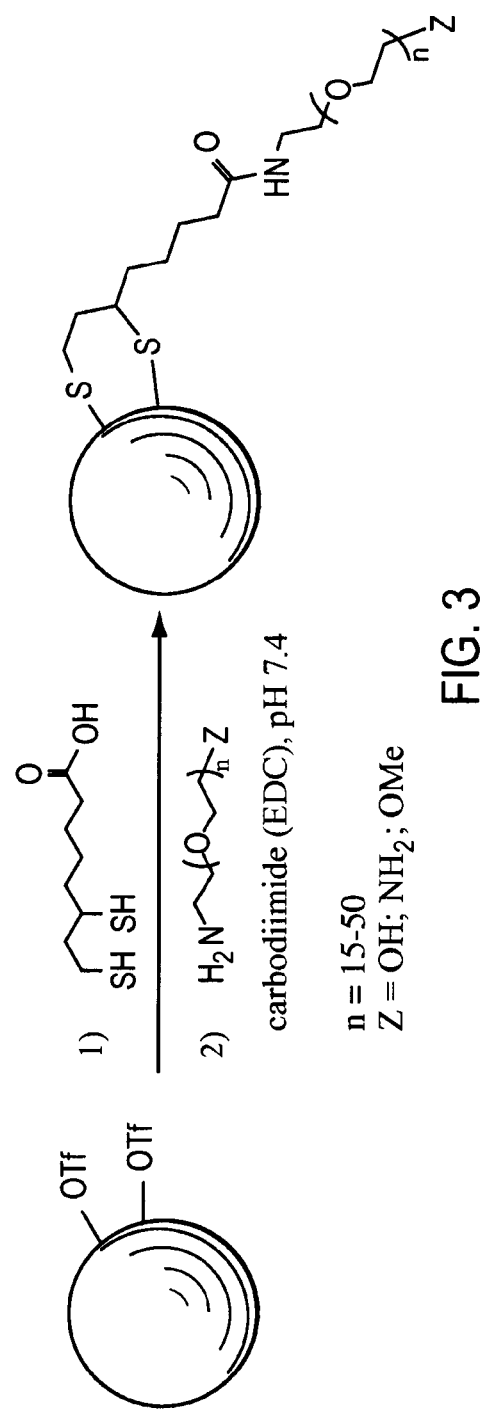
FIG. 3 is a reaction scheme for the attachment of dithiol ligand to sulfonate coated nanocrsytal followed by post-attachment functionalization.

In some embodiments, the method comprises replacing two sulfonate ligands from the surface of a nanocrystal with a dithiol compound that contains a functionalized PEG moiety, as shown in FIG. 2:

For n=6-12, the resultant nanoparticles can be water soluble, and provide quantum yields of between about 60 to about 80% for spherical nanocrystals; however, their colloidal stability may not be high enough for all applications. This can be improved using a slightly modified method, where the PEG moiety can be attached after the dihydrolipoic acid moiety is incorporated into the nanoparticle, as shown in FIG. 3

These nanoparticles are colloidally stable when higher molecular weight PEG moieties are used (n=30-50), and can provide quantum yields of about 60 to about 80%. It was noted that colloidal stability can also be higher for these compositions when rod-shaped nanocrystals are used instead of spherical ones, especially for lower-molecular weight PEG moieties, but quantum yields were generally lower, too.

More generally, two sulfonate ligands on the surface of a nanocrystal can be replaced by reaction with a dithiol compound of Formula (III) or Formula (IV) to provide a nanoparticle of formula (II) or (V) with a dithiol ligand on its surface.

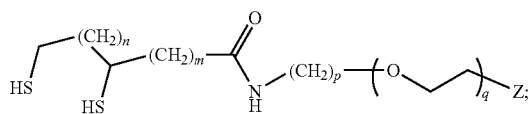
(III)

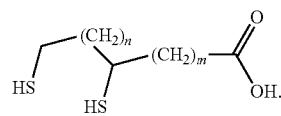
(IV)

Figure 4:
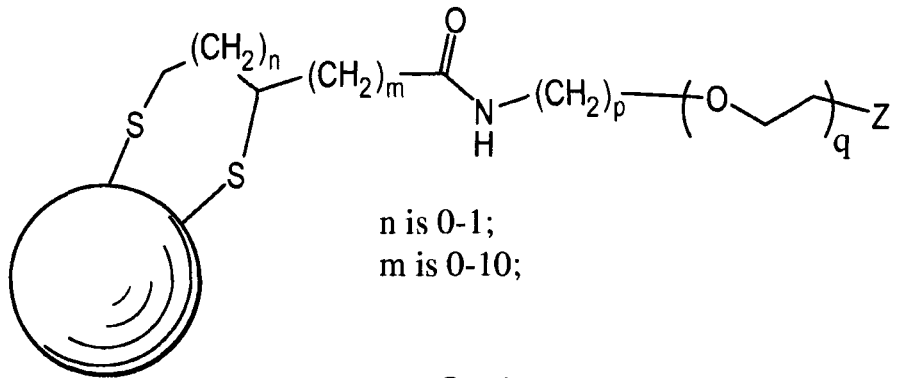
FIG. 4 depicts a nanoparticle prepared by the reaction of a nanocrystal with sulfonate ligands on its surface with the dithiol compound of Formula (III).

The reaction of a nanocrystal with sulfonate ligands on its surface with the dithiol compound of Formula (III) provides a nanoparticle as depicted in FIG. 4:

Referring to FIG. 4, the shaded sphere represents a nanocrystal;
n is 0-1;
m is 0-10;
p is 1-4;
q is 4-50; and
Z is a functional group selected from $COOR^1$, $CONR^1R^2$, $SO_3R^1$, $PO_3R^1$, $NR^1R^2$, $SO_2NR^1R^2$, $NR^1SO_2R^1$, $NR^1C(=O)R^1$, CN, biotin, avidin, and streptavidin;
  wherein each $R^1$ and $R^2$ is independently H or an optionally substituted C1-C4 alkyl, where the alkyl is optionally substituted with one or more groups selected from halo, C1-C4 alkoxy, CN, OH, and COOH;
or Z is a linker connecting the PEG moiety to a biomolecule.

Figure 5:
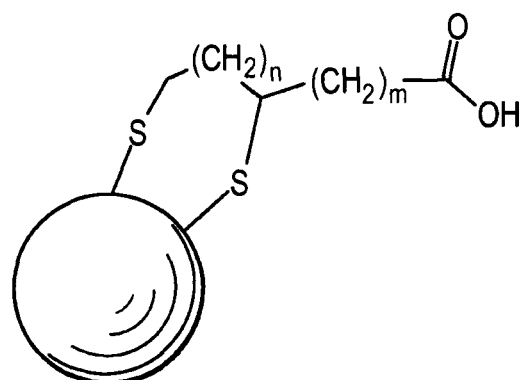
FIG. 5 depicts a nanoparticle prepared by the reaction of a nanocrystal with sulfonate ligands on its surface with the dithiol compound of Formula (IV).

The reaction of a nanocrystal with sulfonate ligands on its surface with the dithiol compound of Formula (IV) can provide a nanoparticle as depicted in FIG. 5, having a carboxylic acid functional group which can undergo further reaction with a variety of other molecules, in particular primary and secondary amines.

Figure 6:
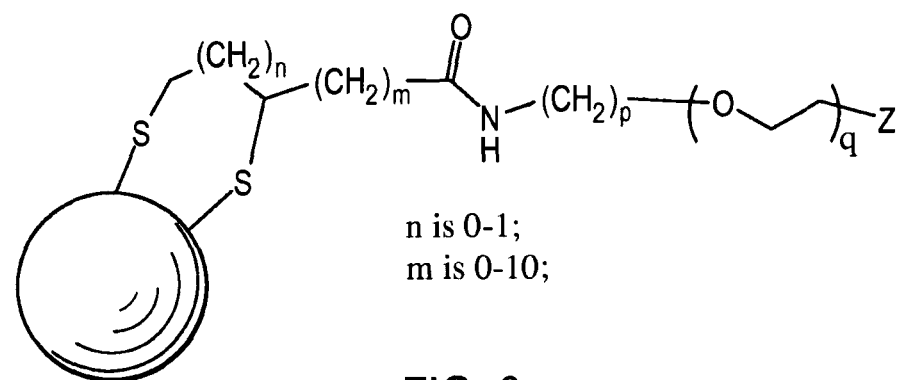
FIG. 6 depicts a nanoparticle prepared by the reaction of a nanoparticle as depicted in FIG. 5 with an amine compound of Formula (VI).

Reaction of the nanoparticle (V) depicted in FIG. 5 with an amine compound of Formula (VI) provides an alternative route to the nanoparticles as depicted in FIG. 6.

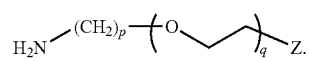
(VI)

Thus in one aspect, the disclosure provides novel nanoparticles made using the methods described herein, comprising the nanoparticle depicted in FIG. 6.

Referring to FIG. 6, the shaded sphere represents a nanocrystal;
n is 0-1;
m is 0-10;

The nanocrystal in these compositions can of course also have other ligands that are not depicted here, and can use other nucleophilic groups besides the dithiols (disclosed above) or imidazoles to bind to the surface of the nanocrystal. That is, although some of the embodiments disclosed above are characterized by dithiol ligands (e.g., DHLA) containing two thiol groups used to hold a ligand onto the surface of a nanocrystal, other embodiments can use tridentate thiol ligands or other types of polydentate thiol ligands.

In some preferred embodiments, the nanocrystal is a core/shell nanocrystal having a shell that includes zinc atoms, since Zn atoms bind especially well to thiol ligands. The thiol groups can be connected to each other by a 2-3 carbon tether, and this tether can be connected to an amide group either by a bond or by an alkylene chain. The amide can in turn be linked through an alkylene group to a polyethylene glycol moiety (PEG) having up to about 50 ethylenoxy subunits. The PEG moiety can in turn be optionally connected to a functional group that provides either water solubility or other desired surface properties, or it comprises an attachment point for a target molecule to be connected to the nanoparticle. Typically, the target molecule will be a biomolecule of interest that can be observed and tracked via the fluorescence properties of the nanocrystal it is attached to. Some suitable biomolecules include, for example, enzymes, nucleic acids, antibodies, hormones, and the like. In some embodiments, the functional group comprises a binding moiety such as avidin, streptavidin, or biotin, and can be used to link the nanoparticle composition to other molecules or surfaces having a complementary binding moiety.

Optionally, a carboxyl or amine or other of these functional groups can be used to connect a biomolecule to the nanoparticle. The biomolecule can be a nucleic acid, enzyme, hormone, or an antibody or antibody fragment. In some embodiments, these compositions are prepared by sulfonate ligand-replacement methods described herein. Preferably, these compositions are prepared by attaching a carboxylate-containing dithiol ligand to the nanocrystal, and then using the carboxylate of the bound dithiol/carboxylate ligand to attach a PEG moiety via peptide bond-forming reaction using conventional peptide forming reagents such as a carbodiimide, carbonyl diimidazole (CDI), and the like.

Dipeptides or tripeptides, or other polypeptides containing up to about 10 amino acid residues, and containing one or more available nucleophilic reactant groups such as amines, carboxylates, phosphonates, phosphinates, imidazoles, thiocarboxylates, thiols, etc., can also be used as the functionalized organic molecule comprising an available nucleophilic reactant group for use in the sulfonate ligand-replacement reactions described above. The amino acids useful in these ligands are not limited; but in some embodiments, these dipeptides, tripeptides and polypeptides consist of amino acids selected from the 20 essential amino acids. In some embodiments, these amino acids are in the natural L-configuration at their alpha-amino acid center; in some embodiments they are racemic at the alpha-amino acid center; and in some embodiments, the D-configuration is used at the alpha-amino acid center. Dipeptides or tripeptides or other polypeptides comprising at least one amino acid with a polar group such as lysine, arginine, glutamate, glutamine, aspartate, histidine or cysteine is included, and the new ligand may bind to the nanocrystal surface through one or more amine, carboxylate, imidazole, thiol, hydroxamate, thioacetate, hydroxyl, amide, guanidine, or similar groups.

Some suitable functionalized organic molecules (ligands) comprise 4-100 atoms, including at least one carbon atom, and at least one heteroatom selected from N, O, S and P. Typically, the functionalized organic molecules (ligands) will comprise two heteroatoms, or at least three heteroatoms, which provide much of the binding affinity to hold the ligand on to the surface of the nanocrystal Amino acids, including alpha-amino acids like the 20 familiar essential amino acids, as well as beta-amino acids, gamma-amino acids and omega-amino acids are suitable. These amino acids may be further substituted by, e.g., hydroxyl, halo, thiol, phosphono, and other heteroatom-containing functional groups.

In some embodiments, the functionalized organic molecule (ligand) is a peptide, amino acid, carboxy-substituted phosphonate, or amino-substituted phosphonate. Naasani, et al., U.S. Pat. No. 6,955,855 and U.S. Pat. No. 7,198,847 describe some suitable functionalized organic amino acid and dipeptide molecules. Some embodiments use a functionalized organic molecule selected from those depicted in Table 1, or a mixture of two or more of these.

TABLE 1

Exemplary Hydrophilic (Water-Solubilizing) ligands.

| 1 | 2 | 3 |
|---|---|---|
| (structure with H₂O₃P, N, COOH, PO₃H₂) | H₂O₃P–CH₂–COOH | (structure with H₂N, N, COOH, COOH) |

| Carnosine | His-Leu | Gly-His |

The functionalized organic molecules (ligands) used need not be all the same on a given nanoparticle; indeed, there may be advantages to mixing different types of molecules to make nanoparticles with a mixture of ligands that may complement each other and provide a more stable nanoparticle. Especially where the functionalized organic molecules (ligands) used include three or more binding moieties, like amino, carboxylate, phosphinate, and phosphonate, mixtures of functionalized organic molecules may be desirable. In some embodiments, the functionalized organic molecules comprise at least two compounds selected from those in Table 1.

In some embodiments, the methods further comprise cross-linking the molecules on the surface of the nanocrystal to further stabilize the coating layer and better preserve the nanocrystal's chemical and photochemical stability. Methods for cross-linking functional groups on a nanocrystal are known in the art, and suitable methods are described in, e.g., Naasani, et al., U.S. Pat. No. 7,198,847 and U.S. Pat. No. 7,205,048, and include use of hydroxymethyl phosphorus compounds as well as more conventional reagents like glutaraldehyde, formaldehyde, acrolein, 1,6-hexane-bisvinylsulfone and the like. The cross-linking methods may be applied to the functionalized organic molecules (ligands) described above, but in some embodiments cross-linking can be applied to cross-link any ligands present on the nanocrystal, including cross-linking multiple layers of molecules on the surface of the nanocrystal.

Where the ligands on the surface of the nanocrystal comprise free amines, suitable crosslinking agents include those mentioned above and, for example, Tris(hydroxymethyl) phosphine (THP) and tris(hydroxymethyl)phosphonium propionate (THPP).

Where the ligands on the surface include free carboxylate groups, crosslinking can be performed by adding a diamine like 1,4-diaminobutane, 1,3-diaminopropane, 1,6-diaminohexane, and the like, using standard peptide-bond forming agents (e.g., a carbodiimide like EDC, DCC, DIPC, etc., or carbonyl diimidazole (CDI)) to make an amine-substituted amide of the carboxylate, followed by crosslinking with reagents like THP or THPP.

Where the ligands on the surface include both amine and carboxylate groups, cross-linking can be done using a carbodiimide or similar peptide bond-forming agent to link some of the amines to some of the carboxylates (especially where ligands include both amine and carboxylate on a single ligand molecule). Alternatively, peptide bond-forming agents can be used in combination with a diamine and/or an agent such as THP or THPP for cross-linking.

In another aspect, a method to replace a phosphonate ligand on a nanocrystal surface, is provided. The method comprises contacting the nanocrystal with a silylsulfonate (e.g., trimethylsilyl triflate) reagent to make an activated nanocrystal as described herein, and contacting the activated nanocrystal with a functionalized organic molecule (ligand) comprising at least one available nucleophilic reactant group. The activated nanocrystal can comprise one or more sulfonate ligands on its surface, where the sulfonate ligands replace the phosphonates or phosphinates that were on the starting nanocrystal, and make the nanocrystal sufficiently reactive for a subsequent step of contacting the activated nanocrystal with a functionalized organic molecule comprising at least one available nucleophilic reactant group, such as those described above.

The activated nanocrystal can be contacted with a nucleophilic reactant group in the presence of an organic solvent that is compatible with the functionalized nanocrystal, i.e., an organic solvent that dissolves or disperses the functionalized nanocrystal. Suitable solvents include the hydrocarbon, aromatic hydrocarbon, and halogenated solvents described above. This step can be conducted at a temperature from about 0° C. to about 100° C., typically between about room temperature and 70° C., and preferably between about 20° C. and about 50° C.

Upon contacting the activated nanocrystal with the functionalized organic molecule, this functionalized organic molecule becomes attached to the surface of the nanocrystal in place of the originally present phosphonate/phosphinate(s). Optionally, the activated nanocrystal can be isolated before it is contacted with the functionalized organic molecule. Methods for isolating the activated nanocrystal include those conventional methods in the art for isolating nanocrystals, such as precipitation, dialysis, centrifugation, gel filtration, and the like. Preferably, the isolation is conducted without exposing the activated nanocrystal to water or oxygen. Once isolated, the sulfonate-containing nanoparticle can be stored for later use, typically in solution in a polar or halogenated organic solvent. Storage is best done under conditions that exclude moisture, and preferably under conditions that also exclude light and oxygen.

The following examples are offered to illustrate but not to limit the embodiments disclosed herein.

Example 1

Process for Exchanging Phosphonate Ligands with Sulfonate (Triflate) Ligands

A nanoparticle comprising a core/shell nanocrystal having TDPA ligands on its surface is dissolved in dichloromethane, and excess TMS triflate is added to it. After 1-2 hours at room temperature, analysis indicates that the TDPA ligands have been removed, and the nanoparticle remains dispersed in the solvent. It is dialyzed against dichloromethane using a 10K MWCO (10,000 molecular-weight cut-off) dialysis membrane to remove excess TMS triflate and the TMS-TDPA produced by the reaction of TMS triflate with the TDPA ligands. This produces a solution/suspension of nanoparticles comprising triflate ligands on the surface of nanocrystals. These triflate-containing nanoparticles are soluble in many organic solvents, but may not be readily soluble in hexanes, depending upon the complement of ligands present.

Example 2

Two-Step Process for Exchanging Sulfonate (Triflate) Ligands with PEG Conjugated Dithiol (DHLA) Ligands Using n-Butanol as an Intermediate Ligand and DMF as a Co-Solvent The triflate-containing nanoparticle solution from Example 1 can be contacted with excess n-butanol in acetonitrile, using DMF as a co-solvent, to provide an intermediate nanoparticle believed to comprise butanol ligands in place of the triflates that were on the nanoparticle from example 1. This intermediate nanoparticle can be isolated from the medium, or it can be further modified without isolation. This intermediate nanoparticle is contacted with an excess of a dihydrolipoic acid-PEG conjugate of this formula:

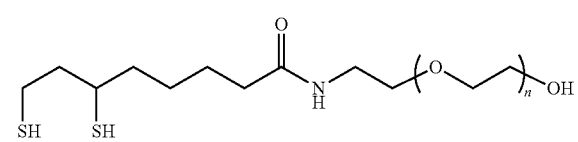

where n is 1-100.

The product is a water-soluble, stable nanoparticle. It can be collected by extraction into a pH 9 buffer, and isolated by conventional methods, including dialysis with a 10K MWCO dialysis filter, or by size exclusion (gel filtration) chromatography.

Example 3

Two-Step Process for Exchanging Sulfonate (Triflate) Ligands with Nucleophilic Reactanct Group Containing Ligands Using n-Butanol as an Intermediate Ligand and DMF as a Co-Solvent The triflate-containing nanoparticle solution from Example 1 can be contacted with excess n-butanol in acetonitrile, using DMF as a co-solvent, to provide an intermediate nanoparticle believed to comprise butanol ligands in place of the triflates that were on the nanoparticle from example 1. This intermediate nanoparticle can be isolated from the medium, or it can be further modified without isolation. To further modify it, it is treated with a new ligand containing at least one nucleophilic reactant group: suitable ligands include HS—$CH_2$—$CH_2$-PEG; aminomethyl phophonic acid; dihydrolipoic acid; omega-thio-alkanoic acids, and carboxymethylphosphonic acid. The mixture is then treated with TMEDA (tetramethylethylene diamine), and monitored until triflate is displaced, then the nanocrystal product is extracted into pH 9 buffer and purified by conventional methods.

Example 4

Process for Exchanging Sulfonate (Triflate) Ligands with Carboxylate Funcionalized Dithiol (DHLA) Ligands The triflate-containing nanoparticle of Example 1 is contacted with neat dihydrolipoic acid (DHLA) for an hour at room temperature, and is then dispersed into pH 9 buffer and isolated by conventional methods. This provides a nanoparticle having carboxylate groups to provide water solubility, and having two thiol groups binding the carboxylate to the nanocrystal surface. The product is water soluble and stable in aqueous buffer. It provides good colloidal stability, and a moderate quantum yield. This composition containing DHLA as a ligand contains free carboxyl groups that can be used to attach other groups such as a PEG moiety, optionally linked to a functional group or a biomolecule.

The same reaction can be performed to replace triflate groups on a nanoparticle with thioglycolic acid (HS—$CH_2$—COOH) ligands. This provides a highly stabilized nanoparticle that produces a high quantum yield, but has lower colloidal stability than the product having DHLA on its surface.

Example 5

Process for Exchanging Sulfonate (Triflate) Ligands with Amine Ligands

The triflate-containing nanoparticle of Example 1 is dispersed in dichloromethane plus hexanes, and an alkylamine is added. Suitable alkylamines are preferably primary amines, and include, e.g., $H_2N$—$(CH_2)_r$-PEG (r=2-10), p-aminomethylbenzoic acid, and lysine ethyl ester. After an hour at room temperature, the exchange process is completed, and the nanoparticle product can be isolated by conventional methods.

Example 6

Process for Pre-treating Phosphonate Coated Nanocrystals with Toluene Acetic Acid to Remove Impurities Prior to Exchanging with Sulfonate (Triflate) Ligands TDPA-covered nanocrystals were synthesized which emitted light at 605 nm and had shells of CdS and of ZnS. These when treated with 200,000 equivalents of TMS triflate in hexanes did not produce a precipitate. This was attributed to excess TDPA-derived impurities in the nanocrystals. This was alleviated by dissolving the nanocrystals in toluene-acetic acid and precipitating them with methanol, to remove TDPA salts or related by-products. The resultant TDPA nanocrystals behaved as described in Example 1, demonstrating that impurities were causing the nanocrystals to behave differently when made with excess TDPA present, and that those impurities can be removed by precipitation under conditions better suited to dissolving TDPA-related impurities.

Example 7

Process for Exchanging Activated (Sulfonate Coated) Nanocrystals with Dithiol (DHLA) Ligands Using Butanol, DMF or Isopropyl Alcohol as Dispersants Three different methods of depositing the DHLA ligands were employed, each of which was considerably more rapid than the classic approach using non-activated dots. In the first approach, the activated dot powder was dispersed in butanol and stirred with DHLA, then precipitated with hexane and collected in aqueous buffer. In the second approach, the activated dot powder was dispersed in dimethylformamide (DMF) and stirred with DHLA, then precipitated with toluene and collected in aqueous buffer. In the third approach, the activated dot powder was stirred as a slurry in neat DHLA, then dispersed in isopropyl alcohol, precipitated with hexane, and collected in aqueous buffer and purified with a filtration membrane.

These three samples, plus a sample derived from non-activated dots were diluted to 60 nM for a colloidal stability challenge, wherein the absorbance is monitored over the course of days to watch for precipitation. Samples 1 (butanol-mediated), 2 (DMF-mediated), and 4 (classic) all precipitated on day 3 or 4 of the stability challenge, but sample 3 (neat DHLA) lasted twice as long, coming out of solution on day 7. HPLC measurements indicated that the DHLA-coated particles produced from activated dots showed even less aggregation than the classic DHLA particles made by the displacement of TOPO or pyridine ligands from nanocrystals. Thus the invention provided rapid reactions leading to improved colloidal stability and comparable or lower aggregation levels than conventional ligand replacement methods of putting DHLA on a nanocrystal.

Similar treatment with other thiol ligands like mercaptoundecanoic acid (MUA) or the PEGylated thiol also provided water-dispersable nanocrystals. Reacting triflate-coated nanoparticles with MUA or PEG-thiol gave particles which were readily dispersible in water, indicating that ligand exchange had occurred. The observed quantum yield was over 70% in each case.

Example 8

Process for Exchanging Activated (Sulfonate Coated) Nanocrystals with Hydrophilic Phosphonate Ligands Triflate-coated dots were dispersed in butanol and then stirred with phosphonoacetic acid. Triethylamine was added to form the triethylammonium salt of both the phosphonate and carboxylate functionalities, and then pH 9 aqueous borate buffer was added to extract the hydrophilic particles. The result was a bright orange aqueous dispersion of quantum dots, with no remaining color observed in the butanol layer. The particles were purified by centrifugal filtration and the quantum yield was measured to be 72%. Multiple batches of particles were prepared and remained in solution through room temperature storage for at least eight weeks. The same method can be successfully employed with DHLA, MUA, and PEGylated thiol ligands.

Example 9

Process for Exchanging Activated (Sulfonate Coated) Nanocrystals with a Variety of Hydrophilic Phosphonate Ligands via Biphasic Exchange Using a biphasic exchange method, dispersing the quantum dots in organic solvents such as chloroform and the exchangeable ligands in aqueous solution, quantum dots were made water soluble and stable after ligand exchange with N,N-Bis(phosphonomethyl)glycine (1) or phosphonoacetic acid (2). In a typical bi-phasic ligand exchange experiment, 1 nmol of quantum dots were dispersed in 1 mL of chloroform and placed in a vial with 2 mL of 300 mM phosphonic acid in basic buffer and the mixture was rapidly stirred at room temperature for 2 days. Quantum yields as high as 53% were achieved; however the quantum yields achieved were dependent on core-shell batch employed, probably as a result of variable amounts of long-chain alkyl phosphonates remaining on the nanocrystal surface post-ligand exchange. This demonstrated that complete removal of TDPA from nanocrystals is important for successful modification of the surface. Though the dots were rendered water stable by the above phosphonate-containing ligands, they were not successfully modified with PEG2000-diamine using standard EDC condensation chemistry.

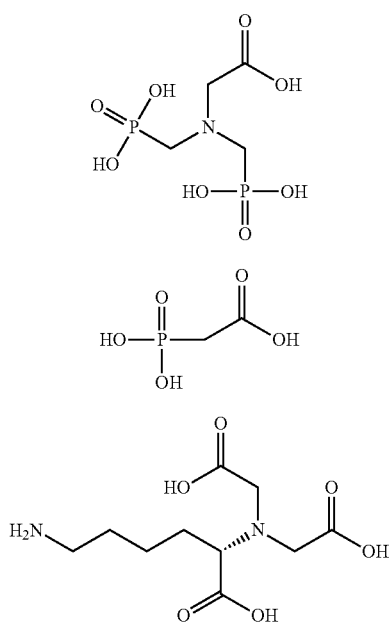

Nanocrystals coated with compounds 1, 2, or 3 were readily prepared by this method, as well as nanocrystals having a mixture of compounds 1 and 2, or 1 and 3, or 2 and 3. In each case, the nanocrystals were stable, bright and water-soluble. Using mixed ligands, it was found that PEGylation (with PEG2000-diamine using standard EDC condensation chemistry) could be achieved with these phosphonate-containing ligands to produce highly stable, bright, water soluble nanoparticles.

These nanoparticles can be further stabilized by at least partially cross-linking the ligands using a diamine such as putrescine, cadaverine, 1,2-diaminoethane, bis(hexamethylene)triamine, PAMAM dendrimer, and cystamine.

Example 10

Two-Step Ligand Exchange Process with Tridentate Thiol Ligands

Triflate exchange step was performed following the procedure described in Example 1. Next, the triflate nanoparticles were dispersed in organic solvent (e.g. toluene, chloroform, etc) with a concentration of between about 0.1 and 10 micromolar quantum dots. Approximately 1000 to 1000000 equivalents of a suitable tridentate thiol ligand was added, optionally as a solution in a suitable organic solvent (e.g. acetone, methanol, etc). The reaction mixture was stirred for 1-48 hours and then the solution was basicified by addition of an organic base (e.g. tetramethylammonium hydroxide, tetrabutylammonium hydroxide, etc). After a shorter second stirring period, water or aqueous buffer was used to extract the dots with hydrophilic ligands. The aqueous solution was washed with additional organic solvent (e.g. toluene, chloroform, etc) and purified by filtration.

Example 11

Figure 7:
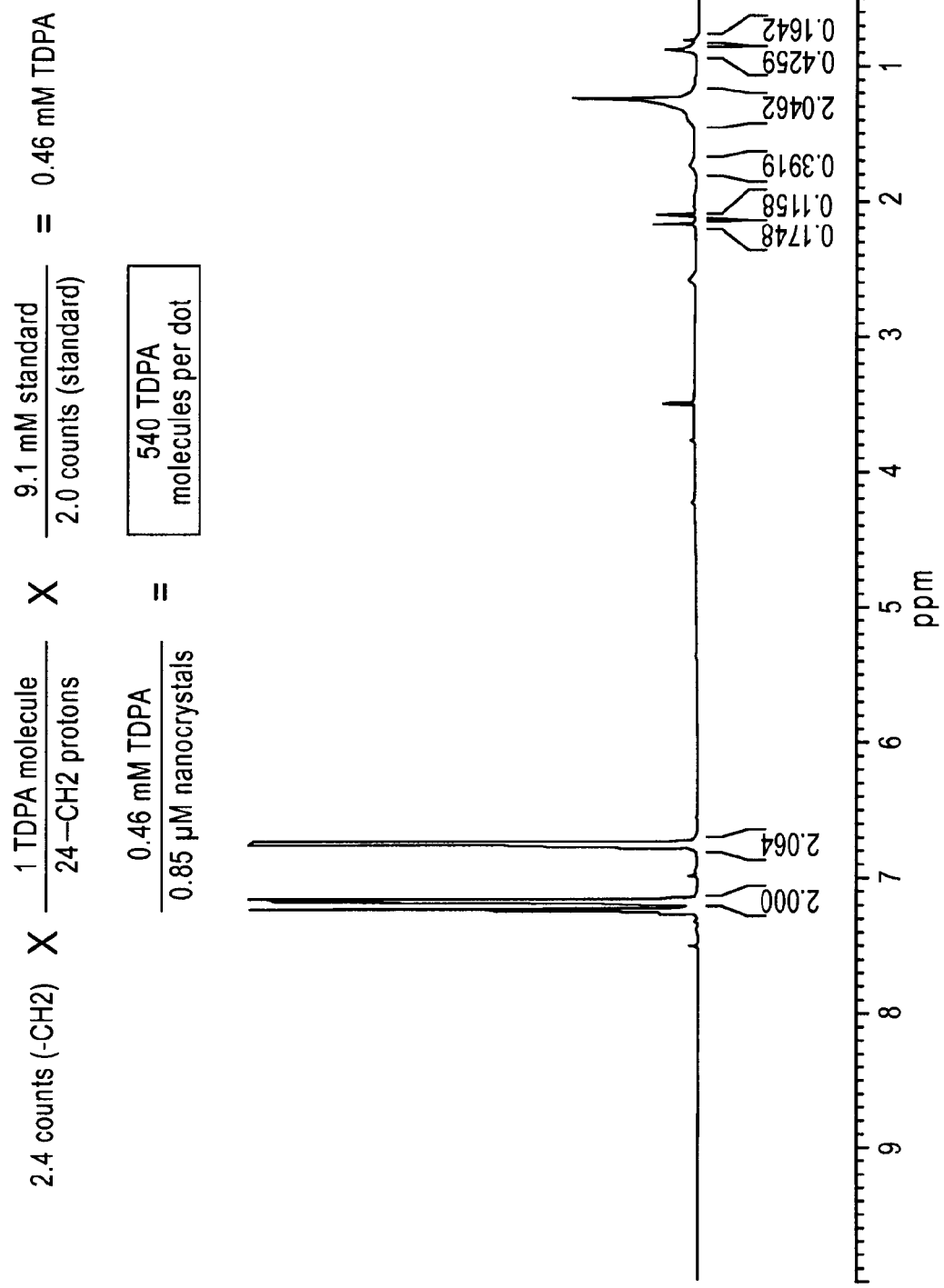
FIG. 7 is a proton NMR spectrum showing relative surface content of TDPA ligands on a nanocrystal surface prior to TDPA ligand exchange.
Figure 8:
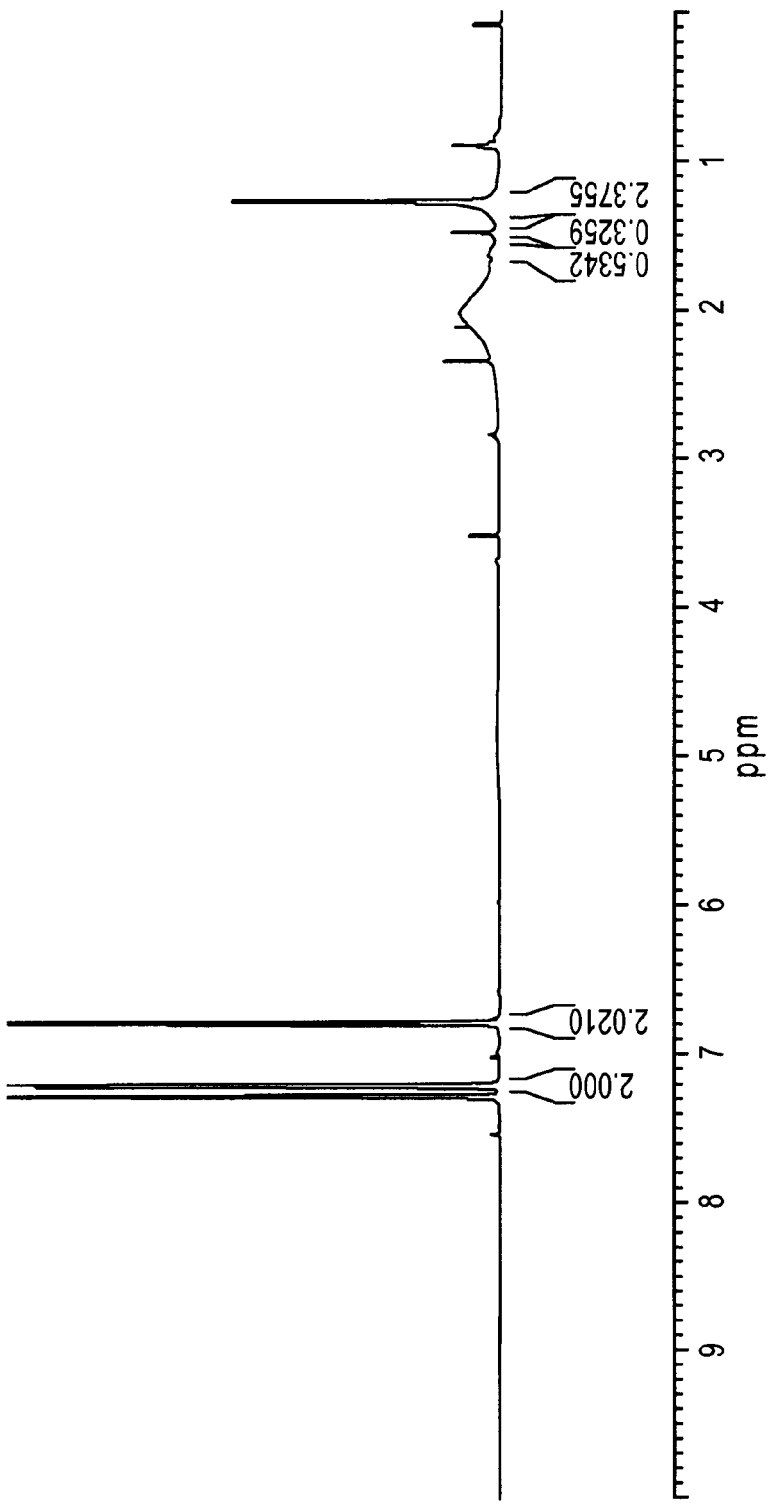
FIG. 8 is a proton NMR spectrum showing relative surface content of triflate ligands and TDPA ligands on a nanocrystal surface post triflate (sulfonate) for TDPA ligand exchange.

Proton NMR and IR Spectrum Showing Relative Surface Content of Triflate Ligands and TDPA Ligands on Nanocrystal Surface Post Triflate (Sulfonate) for TDPA Ligand Exchange In Example 11, the Proton NMR #1 Spectrum (FIG. 7) shows that there are 540 TDPA ligands per nanoparticle prior to the exchange reaction with the silylsulfonate reagent. After the silylsulfonate reagent is introduced and contacts the TDPA ligands more than ¾ of those ligands are exchanged off the nanoparticle surface as shown in the Proton NMR #2 Spectrum (FIG. 8). This substantial exchange of sulfonate ligands in place of TDPA ligands on the nanoparticle surface is further reinforced by an Infrared Spectrum (FIG. 9) showing that there are substantial numbers of sulfonate (i.e., triflate) ligands present after the exchange.

Figure 9:
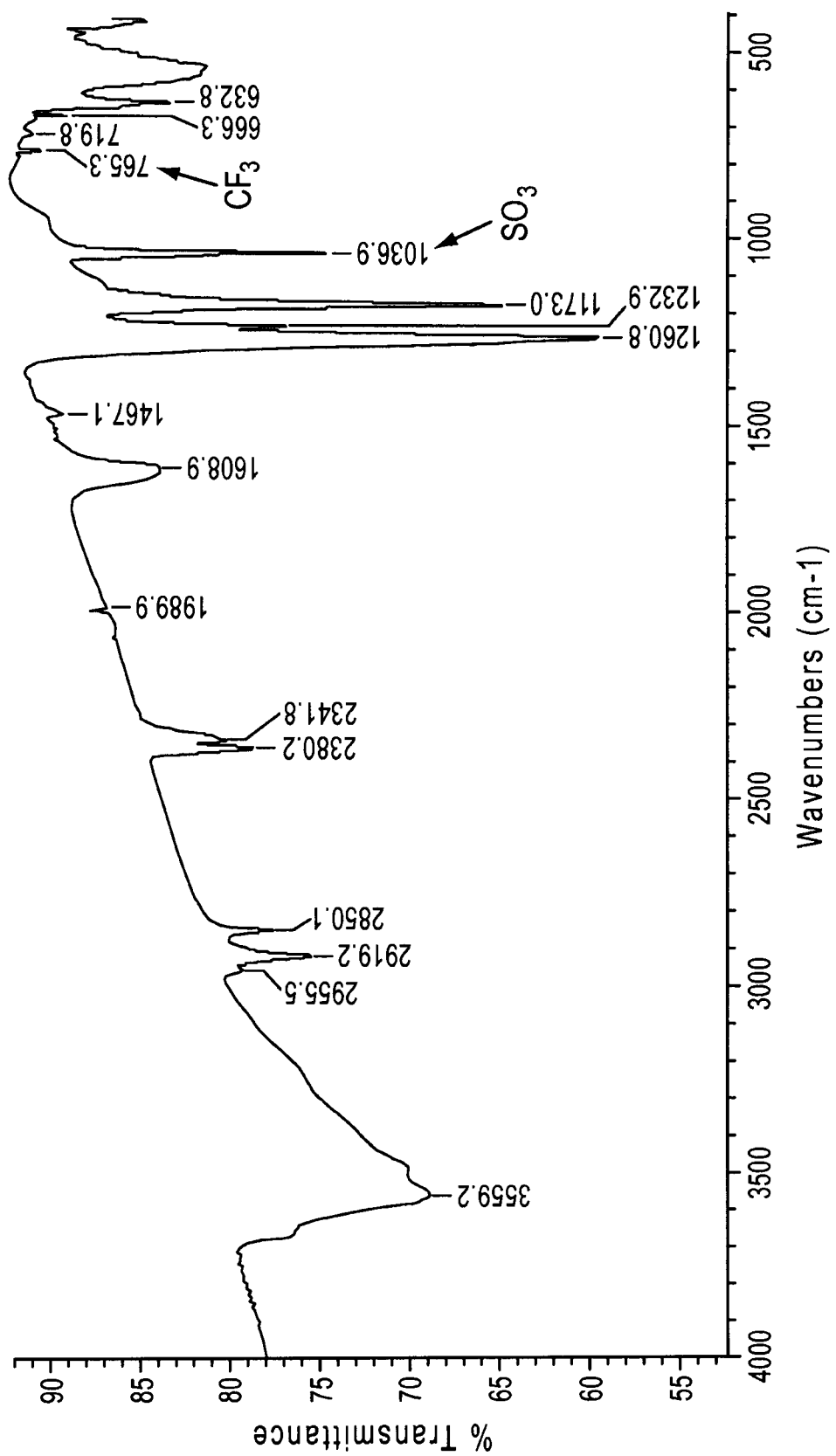
FIG. 9 is an IR spectrum showing relative surface content of triflate ligands and TDPA ligands on a nanocrystal surface post triflate (sulfonate) for TDPA ligand exchange

An 850 nM solution of purified TDPA-coated core-shells in deuterated chloroform was prepared. This solution was divided into two portions. To the first portion was added an aromatic molecule suitable for use as a standard for NMR quantification, in an amount that resulted in a final concentration of 9.1 mM standard. The first portion was then analyzed by conventional proton NMR spectroscopy and the results are shown in Proton NMR Spectrum #1. The second portion was reacted with TMS triflate as described in Example #1 and some of the solid was pressed into a salt plate and used for conventional infrared vibrational spectroscopy whose results are shown in IR Spectrum (FIG. 9). The remaining solid product was again dispersed in deuterated chloroform, this time at a concentration of 2900 nM. Again, the aromatic standard was added to a concentration of 9.1 mM and the solution was analyzed by conventional proton NMR spectroscopy, with results shown in Proton NMR Spectrum #2.

While certain embodiments have been described above, it will be understood that the embodiments are described by way of example only. Those skilled in the art will appreciate that the same can be performed within a wide range of equivalent parameters, concentrations, and conditions without departing from the spirit and scope of the embodiments disclosed herein and without undue experimentation. Accordingly, the compositions/compounds, processes and/or methods described herein should only be limited in light of the claims that follow when taken in conjunction with the above description and accompanying drawings.

What is claimed is:

1. A population of nanoparticles, comprising:
a plurality of nanoparticles dispersed in an organic solvent, wherein each nanoparticle includes a nanocrystal core including a first semiconductor material, a shell including a second semiconductor material, and an outer layer comprising ligands that each comprise a sulfonate, nitrate, borate, or fluorous anion group, wherein the anion group is bound to one or more metal atoms of the second semiconductor material at the surface of the shell, wherein if the ligand comprises sulfonate, then the sulfonate is selected from the group consisting of trifluoromethanesulfonate (triflate), fluoromethanesulfonate, methanesulfonate (mesylate), nitrophenylsulfonate (nosylate), trifluorethylsulfonate, phenylsulfonate (besylate), and toluenesulfonate (tosylate).

2. The population of nanoparticles of claim 1, wherein the ligand comprises a group selected from tetraphenylborate, tetramethylborate, tetraethylborate, tetrafluoroborate, hexafluorophosphate, hexafluoroarsenate, and hexafluoroantimonate.

3. The population of nanoparticles of claim 1, wherein the first semiconductor material and the second semiconductor material are different.

4. The population of nanoparticles of claim 1, wherein the first semiconductor material and the second semiconductor material are the same.

5. The population of nanoparticles of claim 1, wherein the nanocrystal core is comprised of CdSe, CdS, CdTe, InP, InAs, GaP, ZnS, ZnSe or ZnTe.

6. The population of nanoparticles of claim 1, wherein the shell comprises a metal atom selected from the group consisting of Cd, Zn, Ga, Mg, Al, Cr, Mn, Fe, Co, Ni, Cu, Si, and the lanthanides.

7. The population of nanoparticles of claim 6, wherein the shell further comprises an non-metal atom selected from the group consisting of S, Se, Te, P, As, N, O and Sb.

8. A method for preparing water-dispersible nanoparticles, comprising:
providing a sulfonate, nitrate, borate, or fluorous anion ligand coated nanocrystal according to claim 1 dispersed in an organic solvent;
contacting the sulfonate, nitrate, borate, or fluorous anion ligand coated nanocrystal with a functionalized organic molecule comprising at least one nanocrystal surface attachment group;
contacting the nanocrystal dispersion with an aqueous solution to form a biphasic mixture having an aqueous phase and a non-aqueous phase; and
maintaining the biphasic mixture under conditions that cause the nanocrystal to migrate from the non-aqueous phase into the aqueous phase.

9. The method of claim 8, wherein the nanocrystal is a core/shell nanocrystal.

10. The method of claim 8, wherein the nanocrystal surface attachment group is one of a thiol or a peptide.

11. The method of claim 8, wherein the functionalized organic molecule further comprises one or more polar groups that promote water solubility.

12. The method of claim 8, wherein a sufficient number of sulfonate ligands on the nanocrystal are replaced with functionalized organic molecules to produce a water-dispersible nanoparticle.

13. The method of claim 8, wherein the functionalized organic molecule comprises at least two or more thiol groups.

14. The method of claim 13, wherein the functionalized organic molecule is one of DHLA or a tridentate thiol compound.

15. The method of claim 11, wherein the one or more polar groups is selected from the group consisting of carboxyl, amino, hydroxyl, carboxylate ester, or carboxamide.

16. The method of claim 8, wherein the ligand comprises a group selected from tetraphenylborate, tetramethylborate, tetraethylborate, tetrafluoroborate, hexafluorophosphate, hexafluoroarsenate, and hexafluoroantimonate.

17. A method to prepare a nanocrystal with a surface attached functionalized organic molecule, comprising:
providing a nanocrystal according to claim 1 having a surface attached sulfonate, nitrate, borate, or fluorous anion group; and
contacting the nanocrystal with a functionalized organic molecule comprising at least one available nucleophilic reactant group in an organic solvent.

18. The method of claim 17, wherein the nanocrystal is a core/shell nanocrystal.

19. The method of claim 17, wherein the available nucleophilic reactant group is selected from the group consisting of thiols, dithiols, hydroxyls, phosphonates, phosphinates, carboxylates, nitriles, thioesters, phosphines, phosphine oxides, phenylates, oxide ligands, and nitrogenous heterocycles.

20. The method of claim 17, wherein the functionalized organic molecule comprises one or more polar groups that promote water solubility.

21. The method of claim 17, wherein a sufficient number of sulfonate groups on the nanocrystal are replaced with functionalized organic molecules to produce a water-soluble nanocrystal.

22. The method of claim 17, wherein the functionalized organic molecule comprises at least one thiol.

23. The method of claim 17, wherein the functionalized organic molecule comprises two or more thiol groups.

24. The method of claim 17, wherein the functionalized organic molecule comprises one or more thiol groups and further comprises a carboxylic acid, carboxylate ester, or carboxamide.

25. The method of claim 17, wherein the functionalized organic molecule is a peptide, amino acid, carboxy-substituted phosphonate, or amino-substituted phosphonate.

26. A nanocrystal made by the method of claim 17.

* * * * *